United States Patent
Kubota et al.

(10) Patent No.: US 12,554,047 B2
(45) Date of Patent: Feb. 17, 2026

(54) OPTICAL LAMINATED BODY, AND POLARIZING PLATE, SURFACE PLATE, AND IMAGE DISPLAY DEVICE THAT ARE PROVIDED WITH SAID OPTICAL LAMINATED BODY

(71) Applicant: DAI NIPPON PRINTING CO., LTD., Tokyo (JP)

(72) Inventors: Shosei Kubota, Kashiwa (JP); Yoshiko Tanaka, Tokorozawa (JP); Takashi Kuroda, Moriya (JP); Akinobu Ushiyama, Moriya (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 697 days.

(21) Appl. No.: 17/907,434

(22) PCT Filed: Mar. 30, 2021

(86) PCT No.: PCT/JP2021/013435
§ 371 (c)(1),
(2) Date: Mar. 8, 2023

(87) PCT Pub. No.: WO2021/200884
PCT Pub. Date: Oct. 7, 2021

(65) Prior Publication Data
US 2023/0333287 A1     Oct. 19, 2023

(30) Foreign Application Priority Data
Mar. 31, 2020   (JP) .................................. 2020-065371

(51) Int. Cl.
*G02B 1/12*   (2006.01)
*G02B 1/14*   (2015.01)
(Continued)

(52) U.S. Cl.
CPC ................. *G02B 1/12* (2013.01); *G02B 1/14* (2015.01); *G02B 5/3083* (2013.01); *H10K 59/8791* (2023.02)

(58) Field of Classification Search
CPC ... G02B 1/10; G02B 1/12; G02B 1/14; G02B 1/18; G02B 5/30; G02B 5/3025;
(Continued)

(56) References Cited

U.S. PATENT DOCUMENTS

| | | | |
|---|---|---|---|
| 2011/0128477 A1 | 6/2011 | Izaki et al. | |
| 2015/0183945 A1* | 7/2015 | Shiraishi | B32B 7/12 |
| | | | 525/224 |

(Continued)

FOREIGN PATENT DOCUMENTS

| | | |
|---|---|---|
| JP | 2010-264749 | 11/2010 |
| JP | 2011-107198 | 6/2011 |

(Continued)

OTHER PUBLICATIONS

JP 2012-032819, Ikehata Yoshimoto et al., published Feb. 16, 2012, English language machine translation generated Jun. 11, 2025 (Year: 2012).*

(Continued)

*Primary Examiner* — Stephone B Allen
*Assistant Examiner* — Adam W Booher
(74) *Attorney, Agent, or Firm* — HSML P.C.

(57) ABSTRACT

Provided is an optical laminate that is excellent in terms of adhesion between a polyester film having a high degree of plane orientation ΔP and an easy adhesive layer and suppresses a local defect without using an easy adhesive layer of a specific material. The easy adhesive layer, an uneven layer, and an antifouling layer are provided on the polyester film, when a refractive index in a slow axis direction in a plane of the polyester film is defined as nx, a refractive index (Continued)

in a direction orthogonal to the slow axis in the same plane is defined as ny, and a refractive index in a thickness direction of the polyester film is defined as nz, the polyester film satisfies the following formula 1-2, and, regarding the uneven layer, when a three-dimensional skewness of a surface of the uneven layer is defined as Ssk, and a three-dimensional arithmetic average roughness of the surface of the uneven layer is defined as Sa, Ssk and Sa satisfy the following formula 2-1.

$$0.140 \leq \Delta P \quad (1\text{-}2)$$

$$0.80 \leq A \leq 1.90 \quad (2\text{-}1)$$

wherein "$\Delta P$" represents $((nx+ny)/2-nz)$, and "$A$" represents $\log_{10}(Sa\ [\mu m] \times 100/Ssk)$, provided that $0 < Ssk$.

12 Claims, 1 Drawing Sheet

(51) Int. Cl.
    *G02B 5/30*         (2006.01)
    *H10K 59/80*      (2023.01)

(58) Field of Classification Search
    CPC .. G02B 5/3083; G02B 1/118; H10K 59/8791; H10K 59/8793; B32B 7/023; B32B 7/12; B32B 27/36; H05B 33/02
    See application file for complete search history.

(56) References Cited

U.S. PATENT DOCUMENTS

| | | | |
|---|---|---|---|
| 2019/0256410 A1* | 8/2019 | Isshiki | G02B 1/18 |
| 2021/0364673 A1 | 11/2021 | Eguchi et al. | |
| 2022/0187503 A1* | 6/2022 | Suzuki | H10K 50/86 |

FOREIGN PATENT DOCUMENTS

| | | |
|---|---|---|
| JP | 2012-032819 | 2/2012 |
| JP | 2014-016602 | 1/2014 |
| JP | 2015-127134 | 7/2015 |
| JP | 2015-172834 | 10/2015 |
| JP | 2016-006530 | 1/2016 |
| JP | 2016-018068 | 2/2016 |
| JP | 2016-504621 | 2/2016 |
| JP | 2018-063419 | 4/2018 |
| JP | 2019-124914 | 7/2019 |
| JP | 2019-144283 | 8/2019 |
| JP | 2019-144475 | 8/2019 |
| JP | 2020-042243 | 3/2020 |
| JP | 2024083270 A | 6/2024 |
| JP | 2024129294 A | 9/2024 |
| KR | 1020110059522 A | 6/2011 |
| TW | 201800262 A | 1/2018 |
| TW | 201937201 A | 9/2019 |
| WO | 2011/148823 | 12/2011 |
| WO | 2013/146822 | 10/2013 |
| WO | 2015/046047 | 4/2015 |
| WO | 2019/065865 | 4/2019 |
| WO | 2020/204148 | 10/2020 |
| WO | WO-2020196306 A1 * | 10/2020 ........... G02B 5/3033 |

OTHER PUBLICATIONS

International Search Report of PCT/JP2021/013435, Jun. 15, 2021, 9 pages including English translation.

Office Action issued for Taiwanese Patent Application No. 110111605, dated Jul. 16, 2024, 18 pages including English machine translation.

Request for the Submission of an Opinion issued for Korean Patent Application No. 10-2022-7037109, Dispatched date: Aug. 31, 2025, 16 pages including English machine translation.

Notice of Reasons for Refusal issued for Japanese Patent Application No. 2022-512255, Dispatch date: Sep. 24, 2025, 7 pages including English machine translation.

\* cited by examiner

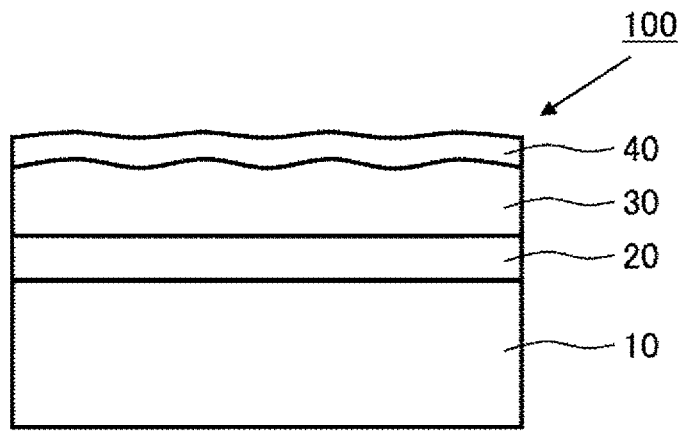

OPTICAL LAMINATED BODY, AND POLARIZING PLATE, SURFACE PLATE, AND IMAGE DISPLAY DEVICE THAT ARE PROVIDED WITH SAID OPTICAL LAMINATED BODY

TECHNICAL FIELD

The present disclosure relates to an optical laminate, and a polarizing plate, a surface plate, and an image display device including the optical laminate.

BACKGROUND ART

In image display devices such as liquid crystal display devices, organic EL display devices, micro-LED display devices, mini-LED display devices, and display devices in which quantum dots are used, for the purpose of improvement in visibility of images, suppression of scratches on device surfaces and the like, a variety of optical laminates are disposed. Such optical laminates are often configured to have a functional layer such as an uneven layer on a plastic film. In addition, as the plastic film in optical laminates, triacetyl cellulose films having small optical anisotropy have been preferably used. In the present specification, "triacetyl cellulose film" may be referred to as "TAC film".

However, TAC films have a problem with dimensional stability and mechanical strength, and this problem becomes significant in image display devices with a large screen.

Therefore, polyester films such as polyethylene terephthalate films have been proposed as an alternative to TAC films. In the present specification, "polyethylene terephthalate film" may be referred to as "PET film".

However, in a case where a PET film is applied to image display devices that output polarized light such as liquid crystal display devices and organic EL display devices, there is a problem in that a rainbow-like interference pattern called rainbow unevenness is generated due to an in-plane retardation of the PET film and the visibility deteriorates.

As a measure to rainbow unevenness, means for extremely increasing the in-plane retardation of PET films has been proposed (for example, PTL 1).

PET films having an in-plane retardation extremely increased as described in PTL 1 can be obtained by uniaxially stretching PET films. However, uniaxially stretched films have a problem of being easily tear in the stretching direction.

As a measure to rainbow unevenness, in contrast to PTL 1, means for decreasing the in-plane retardation of PET films has been proposed.

CITATION LIST

Patent Literature

PTL 1: JP 2011-107198 A
PTL 2: JP 2012-32819 A
PTL 3: JP 2016-6530 A

SUMMARY OF INVENTION

Technical Problem

PET films having a small in-plane retardation can be obtained by, for example, decreasing the stretching ratio. However, in PET films having a decreased stretching ratio, since the mechanical strength decreases due to uneven orientation in the thickness direction, there is a problem of poor practicality.

In addition, as PET films having a small in-plane retardation, PET films of PTLs 2 and 3 can be exemplified. In the PET films of PTLs 2 and 3, the in-plane retardation is decreased by decreasing the stretching ratio difference between an MD direction, which is the flow direction, and a TD direction, which is the width direction compared with those of versatile biaxially stretched PET films.

PET films having an in-plane retardation decreased without decreasing the stretching ratio like PTLs 2 and 3 have a high degree of plane orientation $\Delta P$. Such biaxially stretched PET films having a high degree of plane orientation $\Delta P$ have poor adhesion to an easy adhesive layer and thus have a problem in that, when a functional layer has been imparted on the easy adhesive layer, the interface between the PET film and the easy adhesive layer is likely to peel. The problem can be solved by applying an easy adhesive layer made of a material having excellent adhesion. However, in the solving means, the breadth of choices of the material of the easy adhesive layer is limited, and there is a restriction on product designs, and thus the practicality is poor. In addition, in the case of the optical design of an optical laminate, in a case where an easy adhesive layer made of a specific material is present on a PET film, there is another restriction on the material of a functional layer that is formed on the easy adhesive layer.

In addition, in a case where a functional layer has been formed on a biaxially stretched PET film having a high degree of plane orientation $\Delta P$ through an easy adhesive layer, there are cases where the transmittance and the reflectance locally vary, which generates a local defect in the optical laminate.

The present disclosure has been made in consideration of the above-described problems, and an objective of the present disclosure is to provide an optical laminate that is excellent in terms of adhesion between a polyester film having a high degree of plane orientation $\Delta P$ and an easy adhesive layer and suppresses a local defect without the use of an easy adhesive layer made of a specific material, as well as a polarizing plate, a surface plate, and an image display device including the optical laminate.

Solution to Problem

In order to solve the above-described problems, the present disclosure provides the following [1] to [4].

[1] An optical laminate, including an easy adhesive layer, an uneven layer, and an antifouling layer on a polyester film,
wherein, when a refractive index in a slow axis direction in a plane of the polyester film is defined as nx, a refractive index in a direction orthogonal to the slow axis in the same plane is defined as ny, and a refractive index in a thickness direction of the polyester film is defined as nz, the polyester film satisfies the following formula 1-2, and
regarding the uneven layer, when a three-dimensional skewness of a surface of the uneven layer is defined as Ssk, and a three-dimensional arithmetic average roughness of the surface of the uneven layer is defined as Sa, Ssk and Sa satisfy the following formula 2-1:

$$0.140 \leq \Delta P \quad (1\text{-}2)$$

$$0.80 \leq A \leq 1.90 \quad (2\text{-}1)$$

wherein "ΔP" represents ((nx+ny)/2−nz), and
"A" represents $\log_{10}$ (Sa [μm]×100/Ssk), provided that 0<Ssk.

[2] A polarizing plate including: a polarizer; a first transparent protective plate disposed on one side of the polarizer; and a second transparent protective plate disposed on the other side of the polarizer, wherein at least one selected from the group consisting of the first transparent protective plate and the second transparent protective plate is the optical laminate according to [1], and the optical laminate is disposed such that a surface on the antifouling layer side faces opposite to the polarizer.

[3] A surface plate for an image display device, including an optical laminate attached onto a resin plate or a glass plate, wherein the optical laminate is the optical laminate according to [1], and the optical laminate is disposed such that a surface on the antifouling layer side faces opposite to the resin plate or the glass plate.

[4] An image display device, including the optical laminate according to [1] disposed on a display element such that a surface on the antifouling layer side faces opposite to the display element, and that the optical laminate is disposed on a surface.

Advantageous Effects of Invention

The optical laminate of the present disclosure and the polarizing plate, surface plate, and image display device including the optical laminate are capable of improving adhesion between a polyester film having a high degree of plane orientation ΔP and an easy adhesive layer without the use of an easy adhesive layer made of a specific material, and are capable of suppressing a local defect in the optical laminate.

BRIEF DESCRIPTION OF DRAWING

FIG. 1 is a cross-sectional view for schematically describing an embodiment of an optical laminate of the present disclosure.

DESCRIPTION OF EMBODIMENTS

Hereinafter, an optical laminate of the present disclosure will be described in detail.

In the present specification, the expression of a numerical range "AA to BB" means "AA or more and BB or less".

[Optical Laminate]

The optical laminate of the present disclosure includes an easy adhesive layer, an uneven layer, and an antifouling layer on a polyester film,
when a refractive index in a slow axis direction in a plane of the polyester film is defined as nx, a refractive index in a direction orthogonal to the slow axis in the same plane is defined as ny, and a refractive index in a thickness direction of the polyester film is defined as nz, the polyester film satisfies the following formula 1-2, and
regarding the uneven layer, when a three-dimensional skewness of a surface of the uneven layer is defined as Ssk, and a three-dimensional arithmetic average roughness of the surface of the uneven layer is defined as Sa, Ssk and Sa satisfy the following formula 2-1.

$$0.140 \leq \Delta P \tag{1-2}$$

$$0.80 \leq A \leq 1.90 \tag{2-1}$$

In formula 1-2, "ΔP" represents ((nx+ny)/2−nz).
In formula 2-1, "A" represents $\log_{10}$ (Sa [μm]×100/Ssk), provided that 0<Ssk.

FIG. 1 is a cross-sectional view for schematically describing an embodiment of the optical laminate of the present disclosure. An optical laminate 100 of FIG. 1 has an easy adhesive layer 20, an uneven layer 30, and an antifouling layer 40 on a polyester film 10.

<Polyester Film>

When the refractive index in the slow axis direction in the plane of the polyester film is defined as nx, the refractive index in a direction orthogonal to the slow axis in the same plane is defined as ny, and the refractive index in the thickness direction of the polyester film is defined as nz, the polyester film needs to satisfy the following formula 1-2.

$$0.140 \leq \Delta P \tag{1-2}$$

In formula 1-2, "ΔP" represents ((nx+ny)/2−nz).

In the present specification, the refractive indexes such as nx, ny, and nz, the in-plane retardation, and the retardation in the thickness direction mean values at a wavelength of 550 nm unless particularly otherwise described. In the present specification, "in-plane retardation" may be expressed as "Re", and "retardation in thickness direction" may be expressed as "Rth".

<<Formula 1-2>>

The formula 1-2 prescribes that ΔP that is indicated by "((nx+ny)/2−nz)" is 0.140 or more. ΔP is a parameter that is called the degree of plane orientation and indicates the intensity of the orientation of the entire plane of the film.

In a case where ΔP is less than 0.140, the mechanical strength of the polyester film becomes insufficient, and furthermore, the physical properties, such as pencil hardness, of the optical laminate deteriorate.

ΔP is preferably 0.145 or more and more preferably 0.150 or more. For image display devices of these days, since curved designs are becoming more widespread, in a case where pencil hardness and flexibility are taken into account, the lower limit of ΔP is preferably 0.160 or more and more preferably 0.176 or more.

In a case where ΔP is too large, there are cases where it becomes difficult to obtain nx−ny of 0.0250 or less. Therefore, ΔP is preferably 0.250 or less, more preferably 0.220 or less, and still more preferably 0.200 or less.

Examples of an embodiment of the range of ΔP include 0.140 or more, 0.140 or more and 0.250 or less, 0.140 or more and 0.220 or less, 0.140 or more and 0.200 or less, 0.145 or more and 0.250 or less, 0.145 or more and 0.220 or less, 0.145 or more and 0.200 or less, 0.150 or more and 0.250 or less, 0.150 or more and 0.220 or less, 0.150 or more and 0.200 or less, 0.160 or more and 0.250 or less, 0.160 or more and 0.220 or less, 0.160 or more and 0.200 or less, 0.176 or more, 0.176 or more and 0.250 or less, 0.176 or more and 0.220 or less, and 0.176 or more and 0.200 or less.

The polyester film of the optical laminate of the present disclosure needs to satisfy the formula 1-2. The polyester film that satisfies the formula 1-2 has the above-described physical properties, but is poor in terms of adhesion. In the optical laminate of the present disclosure, an easy adhesive layer and a specific uneven layer are formed in this order on the polyester film that satisfies the formula 1-2, and an antifouling layer is formed on the specific uneven layer, thereby improving the adhesion between the polyester film and the easy adhesive layer and, furthermore, improving adhesion for the entire optical laminate. The reason for the adhesion for the optical laminate to be improved will be described below.

nx, ny, and nz of the polyester film, the in-plane retardation and the retardation in the thickness direction, which will be described below, can be measured with, for example, trade name "RETS-100" manufactured by Otsuka Electronics Co., Ltd.

In the present specification, nx, ny, nz, ΔP, Re, Rth, Sa, Ssk, and A mean the average values of measurement values at 14 sites excluding the minimum value and the maximum value of measurement values at 16 sites unless particularly otherwise described. "A" is "A" in the formula 2-1.

In the present specification, regarding the 16 measurement sites, it is preferable that a 0.5 cm region from the outer edge of a measurement sample is left as a margin, in a region on the inner side of the margin, lines that divide the region into five equal parts in the vertical direction and the horizontal direction are drawn, and measurement is performed mainly at 16 sites of the intersection points. For example, in the case of a quadrangular measurement sample, a 0.5 cm region from the outer edge of the quadrangle is left as a margin, and measurement is performed mainly at 16 sites of the intersection points of dotted lines that divide a region on the inner side of the margin in the vertical direction and the horizontal direction. In addition, the average value of the measurement values at 14 sites excluding the minimum value and the maximum value is regarded as the value of each parameter.

In a case where the shape of the measurement sample is not quadrangular, but circular, elliptical, triangular, or pentagon, it is preferable that a quadrangle that inscribes the shape is drawn and measurement is performed at 16 sites in the quadrangle that are determined by the above-described method.

In the present specification, the atmosphere for measuring the variety of parameters is not particularly limited, the temperature is set to 23° C.±5° C., and the relative humidity is set to 40% or more and 65% or less. In addition, unless particularly otherwise described, before each measurement, the sample is exposed to the atmosphere for 30 minutes or longer.

<<Formula 1-1>>

The polyester film preferably satisfies the following formula 1-1.

$$nx-ny \leq 0.0250 \quad (1\text{-}1)$$

The formula 1-1 prescribes that the difference between the refractive index nx in the slow axis direction in the in-plane of the polyester film and the refractive index ny in the fast axis direction, which is a direction orthogonal to the slow axis in the same plane, is small.

In a case where the formula 1-1 is not satisfied and nx−ny exceeds 0.0250, it is not possible to suppress rainbow unevenness that are attributed to the in-plane retardation.

In the present specification, the rainbow unevenness mean rainbow unevenness visible to naked eyes unless particularly otherwise described.

In addition, in a case where nx−ny exceeds 0.0250, the difference in the refractive index of the polyester film becomes large depending on the viewing direction, and the degree of the reflectance of the optical laminate varying with directions increases. When the reflectance of the optical laminate varies with directions, there are cases where it becomes easy for a local defect that is generated in a case where a formula 2-1 is not satisfied to be recognized. When nx−ny is set to 0.0250 or less, it is possible to make it easy to suppress a local defect being recognized.

nx−ny is more preferably 0.0240 or less and still more preferably 0.0230 or less.

When nx−ny is too small, it is difficult to suppress blackout. Therefore, nx−ny is preferably 0.0050 or more, more preferably 0.0080 or more, and still more preferably 0.0100 or more.

In the present specification, the blackout means a phenomenon in which, when light that has passed through the polarizer and the polyester film in this order is viewed through polarized sunglasses, the entire surfaces become dark.

Regarding configuration conditions that are described in the present specification, for a numerical value, in a case where a plurality of breadths of choices of the upper limit and a plurality of breadths of choices of the lower limit are described, it is possible to produce an embodiment of the numerical value range by combining one selected from the breadths of choices of the upper limit and one selected from the breadths of choices of the lower limit.

For example, in the case of nx−ny, embodiments of the numerical value range of 0.0250 or less, 0.0050 or more and 0.0250 or less, 0.0050 or more and 0.0240 or less, 0.0050 or more and 0.0230 or less, 0.0080 or more and 0.0250 or less, 0.0080 or more and 0.0240 or less, 0.0080 or more and 0.0230 or less, 0.0100 or more and 0.0250 or less, 0.0100 or more and 0.0240 or less, and 0.0100 or more and 0.0230 or less are exemplary examples.

<<Other Properties>>

In the polyester film, the other properties, such as the in-plane retardation and the retardation in the thickness direction, are preferably the following ranges.

In the present specification, the in-plane retardation and the retardation in the thickness direction mean parameters that are calculated from the following formulae. "T" in the following formulae means the thickness of the polyester film.

$$\text{In-plane retardation } (Re)=(nx-ny)\times T \text{ [nm]} \quad (1)$$

$$\text{Retardation in thickness direction } (R\text{th})=((nx+ny)/2-nz)\times T \text{ [nm]} \quad (2)$$

—In-Plane Retardation (Re)—

In the polyester film, the in-plane retardation is preferably 1200 nm or less, more preferably 1100 nm or less, more preferably 1000 nm or less, and more preferably 950 nm or less.

When the in-plane retardation is set to 1200 nm or less, it is possible to make it easy to suppress rainbow unevenness.

In the polyester film, the in-plane retardation is preferably 50 nm or more, more preferably 100 nm or more, more preferably 150 nm or more, more preferably 200 nm or more, more preferably 250 nm or more, more preferably 300 nm or more, and more preferably 400 nm or more.

When the in-plane retardation is set to 50 nm or more, it is possible to make it easy to suppress blackout. As a reason therefor, this is because a polyester film in which the average of the in-plane retardations is less than 50 nm is rarely capable of scattering linearly polarized light and transmits linearly polarized light as it is, but a polyester film in which the average of the in-plane retardations is 50 nm or more is capable of scattering linearly polarized light. In order to improve the mechanical strength, such as pencil hardness, of the polyester film, the in-plane retardation is preferably 520 nm or more and more preferably 620 nm or more.

Examples of an embodiment of the range of the in-plane retardation of the polyester film include 50 nm or more and 1200 nm or less, 50 nm or more and 1100 nm or less, 50 nm or more and 1000 nm or less, 50 nm or more and 950 nm or less, 100 nm or more and 1200 nm or less, 100 nm or more and 1100 nm or less, 100 nm or more and 1000 nm or less, 100 nm or more and 950 nm or less, 150 nm or more and 1200 nm or less, 150 nm or more and 1100 nm or less, 150 nm or more and 1000 nm or less, 150 nm or more and 950 nm or less, 200 nm or more and 1200 nm or less, 200 nm or more and 1100 nm or less, 200 nm or more and 1000 nm or less, 200 nm or more and 950 nm or less, 250 nm or more and 1200 nm or less, 250 nm or more and 1100 nm or less, 250 nm or more and 1000 nm or less, 250 nm or more and 950 nm or less, 300 nm or more and 1200 nm or less, 300 nm or more and 1100 nm or less, 300 nm or more and 1000 nm or less, 300 nm or more and 950 nm or less, 400 nm or more and 1200 nm or less, 400 nm or more and 1100 nm or less, 400 nm or more and 1000 nm or less, 400 nm or more and 950 nm or less, 520 nm or more and 1200 nm or less, 520 nm or more and 1100 nm or less, 520 nm or more and 1000 nm or less, 520 nm or more and 950 nm or less, 620 nm or more and 1200 nm or less, 620 nm or more and 1100 nm or less, 620 nm or more and 1000 nm or less, and 620 nm or more and 950 nm or less.

—Retardation in Thickness Direction (Rth)—

In the polyester film, the retardation in the thickness direction is preferably 2000 nm or more, more preferably 3000 nm or more, still more preferably 4000 nm or more, and far still more preferably 5000 nm or more.

When the retardation in the thickness direction of the polyester film is set to 2000 nm or more, it is possible to make it easy to suppress blackout caused when viewed not only in the front direction, but also in an oblique direction.

The retardation in the thickness direction of the polyester film is preferably 15000 nm or less, more preferably 12000 nm or less, and still more preferably 9000 nm or less in order to easily obtain Re/Rth in a range to be described below.

Examples of an embodiment of the range of the retardation in the thickness direction of the polyester film include 2000 nm or more and 15000 nm or less, 2000 nm or more and 12000 nm or less, 2000 nm or more and 9000 nm or less, 3000 nm or more and 15000 nm or less, 3000 nm or more and 12000 nm or less, 3000 nm or more and 9000 nm or less, 4000 nm or more and 15000 nm or less, 4000 nm or more and 12000 nm or less, 4000 nm or more and 9000 nm or less, 5000 nm or more and 15000 nm or less, 5000 nm or more and 12000 nm or less, and 5000 nm or more and 9000 nm or less.

—Re/Rth—

In the polyester film, Re/Rth is preferably 0.20 or less, more preferably 0.17 or less, and still more preferably 0.15 or less.

Small Re/Rth means that the degree of the stretching of the polyester film becomes close to equal biaxiality. Therefore, when the ratio is set to 0.20 or less, it is possible to improve the mechanical strength of the polyester film and to suppress an adverse influence on the visibility caused by wrinkles that are generated in the polyester film due to an environmental change. In order to easily obtain the above-described effect, the in-plane retardation of the polyester film is preferably in the above-described range.

The lower limit of Re/Rth is normally about 0.01.

Examples of an embodiment of the range of Re/Rth include 0.01 or more and 0.20 or less, 0.01 or more and 0.17 or less, and 0.01 or more and 0.15 or less.

—Haze and Total Light Transmittance—

In the polyester film, the haze as defined in JIS K 7136:2000 is preferably 3.0% or less, more preferably 2.0% or less, and still more preferably 1.0% or less.

In addition, in the polyester film, the total light transmittance as defined in JIS K 7361-1:1997 is preferably 80% or more, more preferably 85% or more, and still more preferably 90% or more.

—Ultraviolet Transmittance—

In the polyester film, the light transmittance at a wavelength of 380 nm is preferably 20% or less and more preferably 10% or less.

—Thickness—

The thickness of the polyester film is preferably 10 μm or more, more preferably 20 μm or more, still more preferably 25 μm or more, and far still more preferably 30 μm or more in order to improve the mechanical strength. When the thickness of the polyester film is set to 10 μm or more, in a case where a different member comes into contact with the polyester film side of the optical laminate and stress is generated, it is possible to make the stress less likely to propagate up to the interface between the polyester film and the easy adhesive layer, which is preferable.

In addition, the thickness of the polyester film is preferably 75 μm or less, more preferably 60 μm or less, still more preferably 55 μm or less, and far still more preferably 50 μm or less in order to decrease the in-plane retardation and improve the bending resistance.

Examples of an embodiment of the range of the thickness of a plastic film include 10 μm or more and 75 μm or less, 10 μm or more and 60 μm or less, 10 μm or more and 55 μm or less, 10 μm or more and 50 μm or less, 20 μm or more and 75 μm or less, 20 μm or more and 60 μm or less, 20 μm or more and 55 μm or less, 20 μm or more and 50 μm or less, 25 μm or more and 75 μm or less, 25 μm or more and 60 μm or less, 25 μm or more and 55 μm or less, 25 μm or more and 50 μm or less, 30 μm or more and 75 μm or less, 30 μm or more and 60 μm or less, 30 μm or more and 55 μm or less, and 30 μm or more and 50 μm or less.

—Stretching—

In order to make it easy for the formulae 1-1 and 1-2 to be satisfied, it is preferable to make the stretching ratios in the vertical direction and in the horizontal direction close to each other without decreasing the stretching ratios in both directions.

Therefore, the polyester film is preferably a stretched film and more preferably a biaxially stretched film.

Specific stretching conditions will be described below.

<<Raw Material>>

Examples of a polyester that configures the polyester film include a homopolymer that is obtained by the polycondensation of a dicarboxylic acid and a diol; a copolymer that is obtained by the polycondensation of one or more dicarboxylic acids and two or more diols; a copolymer that is obtained by the polycondensation of two or more dicarboxylic acids and one or more diols; and a blended resin obtained by mixing one or more homopolymers and one or more copolymers.

The polyester film may contain additives such as an ultraviolet absorbent, easily lubricating particles such as inorganic particles, heat-resistant polymer particles, an alkali metal compound, an alkaline earth metal compound, a phosphorus compound, an antistatic agent, a light stabilizer, a flame retardant, a heat stabilizer, an antioxidant, an antigelling agent, and a surfactant to an extent that the effect of the present disclosure is not impaired.

Examples of the dicarboxylic acid include terephthalic acid, isophthalic acid, orthophthalic acid, 2,5-naphthalenedicarboxylic acid, 2,6-naphthalenedicarboxylic acid, 1,4-naphthalenedicarboxylic acid, 1,5-naphthalenedicarboxylic acid, diphenylcarboxylic acid, diphenoxyethanedicarboxylic acid, diphenylsulfonecarboxylic acid, anthracenedicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethyl malonic acid, succinic acid, 3,3-diethylsuccinic acid, glutaric acid, 2,2-dimethylglutaric acid, adipic acid, 2-methyladipic acid, trimethyladipic acid, pimelic acid, azelaic acid, dimer acid, sebacic acid, suberic acid, dodecanedicarboxylic acid, and the like.

Examples of the diol include ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexadiol, 2,2-bis(4-hydroxyphenyl) propane, bis(4-hydroxyphenyl) sulfone, and the like.

Among polyesters, polyethylene terephthalate is preferable in order to improve the mechanical strength. That is, the polyester film preferably contains polyethylene terephthalate.

Examples of a method for polymerizing the polyethylene terephthalate include a direct polymerization method in which terephthalic acid, ethylene glycol, and, if necessary, a different dicarboxylic acid component and a different diol component are directly reacted with one another; an ester exchange method in which an ester exchange reaction is caused between a dimethyl ester of terephthalic acid and ethylene glycol; and the like. In the ester exchange method, the dimethyl ester of terephthalic acid may contain a methyl ester of a different dicarboxylic acid as necessary. In the ester exchange method, the ethylene glycol may contain a different diol component as necessary.

The intrinsic viscosity of the polyethylene terephthalate is preferably 0.45 or higher and 0.70 or lower. When the intrinsic viscosity is lower than 0.45, the tear resistance improvement effect deteriorates, and, when the intrinsic viscosity is higher than 0.70, the filtration pressure significantly increases, which makes high-precision filtration difficult.

<<Layer Configuration>>

The polyester film may be a single-layer structure or a multilayer structure.

In the case of a single-layer structure, the control of stretching is easy. When the stretching ratios in the vertical direction and in the horizontal direction are made close to each other without decreasing the stretching ratios in both directions, it becomes easy to satisfy the formulae 1-1 and 1-2. Therefore, a single-layer structure, in which stretching is easy to control, is preferable from the viewpoint of easily satisfying the formulae 1-1 and 1-2.

On the other hand, the polyester film having a multilayer structure is capable of imparting an effect that is obtained by, for example, changing the composition of each layer, which is preferable. For example, when a laminated polyester film composed of at least three or more layers is produced by co-extrusion, and a polyester having a small oligomer content is used in the surface layers, it is possible to make it easy to suppress the amount of an oligomer precipitated on the surfaces of the film after a thermal treatment.

In a case where the polyester film has a multilayer structure, regarding the thickness of the surface layers, the thickness of the surface layer on one side alone is preferably 3 μm or more and more preferably 5 μm or more and is 25% or less, more preferably 20% or less, and particularly preferably 10% or less of the total thickness.

<<Manufacturing Example of Polyester Film>>

An embodiment of a method for manufacturing the polyester film will be described using a PET film as an example.

First, PET pellets are sufficiently dried in a vacuum. The vacuum-dried PET pellets are supplied to an extruder, then, melt-extruded into a sheet shape at 260° C. or higher and 290° C. or lower, then, cooled and solidified, thereby producing a non-stretched PET sheet. At this time, high precision filtration is performed at an arbitrary place where the molten resin is held at 260° C. or higher and 290° C. or lower in order to remove a foreign matter that is contained in the resin. A filter medium that is used in the high precision filtration of the molten resin is not particularly limited, but a filter medium of a sintered stainless steel body is preferable. The filter medium of a sintered stainless steel body is excellent in terms of performance of removing an agglomerate containing Si, Ti, Sb, Ge, or Cu as a main component and a high-melting point organic substance. Furthermore, the filtration particle size of the filter medium is preferably 15 μm or less. The filter particle size is a value at an initial filtration efficiency of 95%.

In the extrusion method, PET is melted and extruded from an extrusion nozzle, then, cooled and solidified with a cooling roll, thereby obtaining a non-stretched sheet. Polyester resin layers may be laminated using two or three extruders, two or three layers of multi-manifolds or feedblocks as necessary. For the purpose of improving the sheet flatness, an electrostatic application adhesion method or a liquid application adhesion method is preferably used in order to enhance adhesion between the sheet and a rotary cooling drum.

The non-stretched film obtained as described above is stretched in the longitudinal direction with a roll heated to 70° C. or higher and 120° C. or lower, thereby obtaining a uniaxially-oriented PET film. In a case where there is a desire to reduce the distortion of the orientation principal axis caused by a so-called bowing phenomenon, a method in which the stretching ratio in the longitudinal direction is decreased to an extent that there is no problem of a thickness variation or a method in which the stretching temperature is set to be high may be adopted.

The surface temperature at the time of beginning stretching is preferably 80° C. or higher and 93° C. or lower. When the surface temperature is in this temperature range, orientation and crystallization do not progress excessively in the initial stage of stretching, and thus it is possible to obtain preferable $\Delta P$.

Next, both end portions of the film are gripped with clips, the film is guided to a hot air zone heated to 70° C. or higher and 200° C. or lower, dried and then stretched in the width direction. Subsequently, the film is guided to a thermal treatment zone in the range of a heat setting temperature to be described below and thermally treated, thereby completing crystal orientation. During this thermal treatment step, a relaxation treatment of 2% or more and 10% or less may be performed in the width direction or the longitudinal direction as necessary.

The PET film may be manufactured not by sequential biaxial stretching but by simultaneous biaxial stretching.

The stretching ratios during the stretching of the film is preferably twice or more and 6.5 times or less, more preferably 2.5 times or more and 5.5 times or less, and still more preferably triple or more and 4.8 times or less both in the longitudinal direction and in the width direction.

When the film stretching ratio is set to twice or more, it is possible to make it easy for the formula 1-2 to be satisfied. In addition, when the film stretching ratio is set to 6.5 times or less, it is possible to make it easy to suppress $\Delta P$ becoming too large, and furthermore, it is possible to make it easy to suppress wrinkles, cracks, or the like during the production of the film.

"Stretching ratio in longitudinal direction/stretching ratio in width direction", which is the ratio of the stretching ratio in the longitudinal direction to the stretching ratio in the width direction, is preferably 1.7 or less and more preferably 1.4 or less. In addition, the ratio is preferably 0.5 or more, more preferably 0.7 or more, and still more preferably 1.0 or more.

When the stretching ratio in longitudinal direction/stretching ratio in width direction is set in the above-described range, it is possible to make it easy for the formula 1-1 to be satisfied.

In the case of adopting sequential stretching, there is a tendency that the orientation of the film is strongly affected by the stretching direction in the final stage. Therefore, in sequential stretching, it is preferable to set the stretching ratio in the longitudinal direction to be higher than the stretching ratio in the width direction.

In addition, in the case of adopting sequential stretching, stretching in the width direction is preferably performed in at least two divided stages. Particularly, stretching in the width direction is preferably performed in two or more divided sections with different stretching temperatures. In this case, the stretching temperature in the following stage is desirably performed at a higher temperature than the stretching temperature in the previous stage by preferably 5° C. or more and more preferably 10° C. or more. The stretching step in the following stage at a high temperature is capable of relaxing the distortion of optical properties caused by bowing in the width direction that has occurred in the previous stage and is thus capable of suppressing a variation in the in-plane retardation in the width direction. In addition, in the case of two stages of width stretching, the stretching ratio in the following stage is preferably set to be lower than the stretching ratio in the previous stage. The lower stretching ratio in the following stage makes it possible to suppress the deterioration of the thickness variation of the film. Specifically, in a case where width stretching is performed in two stages, it is preferable to perform the first stage of stretching at 1.5 times or more and 4.5 times or less in a range of 120° C. or higher and 200° C. or lower and then, furthermore, perform re-stretching at a ratio of 1.01 times or more and 2.0 times or less at 150° C. or higher and 230° C. or lower. Here, a case where the first stage of stretching is performed in a range of 120° C. or higher and 200° C. or lower and the second stage of stretching is performed in a range of 150° C. or higher and 230° C. or lower will be described as an example. The first stage of stretching may be referred to as TD1, and the second stage of stretching may be referred to as TD2.

In the case of performing the second stage of stretching in the above-described range, the stretching temperature of TD1 is preferably 120° C. or higher and 200° C. or lower and more preferably 130° C. or higher and 150° C. or lower. When the stretching temperature is 120° C. or lower, the film ruptures, and, when the stretching temperature is 200° C. or higher, the distortion of the film properties in the width direction becomes large. The stretching ratio is preferably 1.5 times or more and 4.5 times or less. Furthermore, the stretching temperature of TD2 is preferably 150° C. or higher and 230° C. or lower and more preferably 180° C. or higher and 220° C. or lower. The stretching ratio is preferably 1.01 times or more and 2.0 times or less.

When the two stages of stretching are both performed in the temperature range of 120° C. or higher and 230° C. or lower and, furthermore, the total stretching ratio of the two stages is set to 3.0 times or more and 4.8 times or less as described above, it is possible to reduce a variation in the in-plane retardation in the width direction while holding the planar orientation by which the mechanical strength can be held.

From the viewpoint of improving the thermal dimensional stability of the film, heat setting is preferably performed at a high temperature. Specifically, the upper limit of the heat setting temperature is preferably higher than 130° C. and more preferably 160° C. or higher. However, when the heat setting temperature is performed at a high temperature, the film is likely to be affected by optical distortion caused by bowing, and there are cases where a variation in the in-plane retardation becomes large. Therefore, the upper limit of the heat setting temperature is preferably 220° C. or lower.

<Easy Adhesive Layer>

The optical laminate of the present disclosure needs to have an easy adhesive layer between the polyester film and an uneven layer.

In a case where the optical laminate does not have an easy adhesive layer, it is not possible to improve adhesion as the entire optical laminate even when the optical laminate has an uneven layer and an antifouling layer, which will be described below.

A resin that configures the easy adhesive layer is not particularly limited, examples thereof include thermoplastic resins such as polyester resins, polyurethane resins, and acrylic resins and thermosetting resins, and a thermoplastic resin is preferable. In addition, among thermoplastic resins, a polyester resin and a polyurethane resin, which are likely to reduce the refractive index difference between the polyester film and the easy adhesive layer and the refractive index difference between the easy adhesive layer and the uneven layer, is preferable, and a polyester urethan resin is more preferable.

The number-average molecular weight of the resin that configures the easy adhesive layer is preferably 10,000 or more and more preferably 20,000 or more. The number-average molecular weight of the same resin is preferably 100,000 or less and more preferably 60,000 or less. When the number-average molecular weight of the resin that configures the easy adhesive layer is set to the above-described range, it is possible to make it easy to suppress the cohesive failure of the easy adhesive layer.

Examples of a preferable range of the number-average molecular weight of the resin that configures the easy adhesive layer include 10,000 or more and 100,000 or less, 10,000 or more and 60,000 or less, 20,000 or more and 100,000 or less, and 20,000 or more and 60,000 or less.

The glass transition temperature of the resin that configures the easy adhesive layer is preferably 30° C. or higher, more preferably 50° C. or higher, and still more preferably 70° C. or higher. The glass transition temperature of the same resin is preferably 120° C. or lower, more preferably 110° C. or lower, and still more preferably 90° C. or lower. When the glass transition temperature of the resin that configures the easy adhesive layer is set to the above-described range, it is possible to make it easy to suppress the embrittlement of the easy adhesive layer caused by heat during steps. Examples of the heat during steps include heat in a drying step of an uneven layer coating liquid and an antifouling layer coating liquid and heat by heating at the time of attaching the optical laminate to a polarizer.

Examples of a preferable range of the glass transition temperature of the resin that configures the easy adhesive layer include 30° C. or higher and 120° C. or lower, 30° C.

or higher and 110° C. or lower, 30° C. or higher and 90° C. or lower, 50° C. or higher and 120° C. or lower, 50° C. or higher and 110° C. or lower, 50° C. or higher and 90° C. or lower, 70° C. or higher and 120° C. or lower, 70° C. or higher and 110° C. or lower, and 70° C. or higher and 90° C. or lower.

The easy adhesive layer may contain additives such as a refractive index modifier, a dye, a pigment, a leveling agent, an ultraviolet absorber, an antioxidant, and a light stabilizer; a variety of crosslinking agent for adjusting the hardness or the viscosity to an extent that the effect of the present disclosure is not impaired. Examples of the crosslinking agent include non-yellowing type XDI-based, IPDI-based, and HDI-based isocyanates, ionizing radiation curable polyfunctional monomers, and the like.

The easy adhesive layer may be formed by an inline coating method in which coating is performed during the production of the polyester film or may be formed by an offline coating method in which coating is performed after the production of the polyester film.

The dry coating amount of the easy adhesive layer is preferably 0.05 g/m² or more and 0.75 g/m² or less. The thickness of the easy adhesive layer is not particularly limited, but is preferably 10 nm or more and 600 nm or less. In a case where the polyester film, the easy adhesive layer, the uneven layer, and the antifouling layer are laminated, in order to prevent poor visibility that is attributed to the refractive index difference in each interface, the thickness of the easy adhesive layer is preferably 10 nm or more and 40 nm or less or 70 nm or more and 270 nm or less.

<Uneven Layer>

The optical laminate of the present disclosure has an uneven layer on the easy adhesive layer.

<<Formula 2-1>>

Regarding the uneven layer, when the three-dimensional skewness of the surface of the uneven layer is defined as Ssk, and the three-dimensional arithmetic average roughness of the surface of the uneven layer is defined as Sa, Ssk and Sa satisfy the following formula 2-1.

$$0.80 \leq A \leq 1.90 \quad (2\text{-}1)$$

In formula 2-1, "A" represents $\log_{10}$ (Sa [µm]×100/Ssk), provided that 0<Ssk.

In the present specification, Ssk is the skewness Rsk of the roughness curve of a secondary roughness parameter described in JIS B 0601:1994 extended to three dimensions and is calculated by the following formula "(a)" when orthogonal coordinate axes, X and Y axes, are placed on a reference plane, a measured surface shape curve is expressed as z=f(x, y), and the magnitudes of the reference surface are defined as Lx and Ly. Ssk is prescribed in ISO 25178:2012.

Ssk is an index that indicates the degree of a bias in the positive direction or the negative direction of the distribution of elevations with respect to the average value of the elevations of the entire measurement plane as a reference. In a case where the distribution of elevations is a normal distribution, Ssk is zero. When the distribution of elevations is biased in the negative direction, Ssk is a positive value, and, as the degree of the bias in the negative direction of the distribution of elevations becomes larger, the value of Ssk becomes larger in the positive direction. On the other hand, when the distribution of elevations is biased in the positive direction, Ssk is a negative value, and, as the degree of the bias in the positive direction of the distribution of elevations becomes larger, the value of Ssk becomes larger in the negative direction.

[Math 1]

$$Ssk = \frac{1}{Sq^3} \int_0^{Lx} \int_0^{Ly} f^3(x, y) dx dy \quad (a)$$

In the formula (a), "Sq" is the root-mean-square deviation of a surface height distribution that is defined by the following formula "(b)".

[Math 2]

$$Sq = \sqrt{\frac{1}{LxLy} \int_0^{Lx} \int_0^{Ly} f^2(x, y) dx dy} \quad (b)$$

In the present specification, Sa is the arithmetic average roughness Ra of a secondary roughness parameter described in JIS B 0601:1994 extended to three dimensions and is calculated by the following formula "(c)" when orthogonal coordinate axes, X and Y axes, are placed on a reference plane, and a roughness curve is expressed as Z (x, y). Sa is prescribed in ISO 25178:2012.

[Math 3]

$$Sa = \frac{1}{Ar} \int_0^{Lx} \int_0^{Ly} |Z(x, y)| dx dy \quad (c)$$

In the formula (c), Ar=Lx×Ly.

"A" in the formula 2-1 is indicated by "$\log_{10}$ (Sa [µm]×100/Ssk)".

Therefore, it can be said that "A" in the formula 2-1 indicates an extremely small value in the case of any of the following x-1 to x-3.

x-1: A case where Sa is too small.
x-2: A case where Ssk is too large.
x-3: A case where Sa is appropriately small and Ssk is appropriately large.

In a case where Sa of the uneven layer is too small as in x-1, the unevenness of the uneven layer is rarely reflected on the surface of the antifouling layer, and the surface of the optical laminate, which is the surface of the antifouling layer, becomes substantially flat. When a different member comes into contact with the optical laminate having a substantially flat surface shape, stress is applied in a state where the different member sticks to the surface of the optical laminate, and thus the stress propagates to the interface between the polyester film and the easy adhesive layer almost without being mitigated. Therefore, when Sa of the uneven layer is too small as in x-1, there are cases where it is not possible to improve the adhesion in the interface between the polyester film and the easy adhesive layer.

In addition, in a case where Ssk of the uneven layer is too large as in x-2, the proportion of sea portions having an elevation lower than the average in the uneven layer becomes large. As a result, the surface of the optical laminate, which is the surface of the antifouling layer, forms a shape in which the proportion of the sea portions is extremely high. When a different member comes into contact with the optical laminate having a surface shape with an extremely large number of sea portions, stress is applied in a state where the different member sticks to the sea portions of the optical laminate, and thus the stress propagates to the interface between the polyester film and the easy adhesive layer almost without being mitigated. Therefore, when Ssk of the uneven layer is too large as in x-2, there are cases where it is not possible to improve the adhesion in the interface between the polyester film and the easy adhesive layer. In addition, in a case where the antifouling layer is formed on the uneven layer where Ssk is too large, the antifouling layer is sufficiently formed at sites corresponding to the sea portions of the uneven layer, but the antifouling layer is not easily formed at sites corresponding to island portions of the uneven layer, and thus a thickness variation is caused in the antifouling layer. Therefore, there are cases where a local defect is generated in the optical laminate due to the generation of bright spots or the like that are attributed to a difference in transmittance or reflectance between the sites corresponding to the sea portions and the sites corresponding to the island portions.

In addition, a case where Sa is appropriately small and Ssk is appropriately large as in x-3 indicates that, in the surface shape, the degree of unevenness is small and the proportion of the sea portions is appropriately high compared with that of the island portions. When a different member has come into contact with the optical laminate having such a surface shape, stress is applied in a state where the different member sticks to the sea portions of the optical laminate, and thus the stress propagates to the interface between the polyester film and the easy adhesive layer almost without being mitigated. Therefore, when Sa is appropriately small and Ssk is appropriately large as in x-3, there are cases where it is not possible to improve the adhesion in the interface between the polyester film and the easy adhesive layer.

In addition, it can be said that "A" in the formula 2-1 indicates an extremely large value in the case of any of the following y-1 to y-3.

y-1: A case where Sa is too large.
y-2: A case where Ssk is too small.
y-3: A case where Sa is appropriately large and Ssk is appropriately small.

In a case where Sa of the uneven layer is too large as in y-1, the antifouling layer is sufficiently formed at sites corresponding to the sea portions of the uneven layer, but the antifouling layer is not easily formed at sites corresponding to island portions of the uneven layer, and thus a thickness variation is caused in the antifouling layer. Therefore, there are cases where a local defect is generated in the optical laminate due to the generation of bright spots or the like that are attributed to a difference in transmittance or reflectance between the sites corresponding to the sea portions and the sites corresponding to the island portions.

In addition, in a case where Ssk of the uneven layer is too small as in y-2, the ratio between the island portions and the sea portions on the uneven layer becomes close to 1:1, and furthermore, the ratio between the island portions and the sea portions on the surface of the optical laminate becomes close to 1:1. The different member is likely to come into contact with the island portions compared with the sea portions and thus likely to stick to the island portions. Therefore, when a different member has come into contact with the optical laminate having a surface shape where Ssk of the uneven layer is too small as in y-2, stress is applied in a state where the different member sticks to the island portions of the optical laminate, and thus the stress propagates to the interface between the polyester film and the easy adhesive layer almost without being mitigated. Therefore, when Ssk of the uneven layer is too small as in y-2, there are cases where it is not possible to improve the adhesion in the interface between the polyester film and the easy adhesive layer.

In addition, a case where Sa is appropriately large and Ssk is appropriately small as in y-3 indicates that, in the surface shape, the unevenness is approximately large and the proportion of the sea portions is not too high compared with that of the island portions. In the optical laminate having such a surface shape, the sticking problem is less likely to be caused; however, while the antifouling layer is sufficiently formed at sites corresponding to the sea portions of the uneven layer, the antifouling layer is not easily formed at sites corresponding to island portions of the uneven layer, and thus a thickness variation is caused in the antifouling layer. Therefore, there are cases where a local defect is generated in the optical laminate due to the generation of bright spots or the like that are attributed to a difference in transmittance or reflectance between the sites corresponding to the sea portions and the sites corresponding to the island portions.

Based on what has been described above, in a case where the formula 2-1 is not satisfied, it is not possible to improve the adhesion in the interface between the polyester film and the easy adhesive layer. Furthermore, in a case where the formula 2-1 is not satisfied, since a thickness variation is caused in the antifouling layer, a problem of local bright spots or the like that are attributed to a difference in transmittance or reflectance is caused. That is, in a case where the formula 2-1 is not satisfied, it is not possible to suppress the problem of the local defect of the optical laminate.

In the formula 2-1, "A" is preferably 0.90 or more, more preferably 0.95 or more, and still more preferably 1.00 or more. In addition, in the formula 2-1, "A" is preferably 1.75 or less, more preferably 1.65 or less, and still more preferably 1.60 or less.

Examples of an embodiment of the range of "A" in the formula 2-1 include 0.80 or more and 1.90 or less, 0.80 or more and 1.75 or less, 0.80 or more and 1.65 or less, 0.80 or more and 1.60 or less, 0.90 or more and 1.90 or less, 0.90 or more and 1.75 or less, 0.90 or more and 1.65 or less, 0.90 or more and 1.60 or less, 0.95 or more and 1.90 or less, 0.95 or more and 1.75 or less, 0.95 or more and 1.65 or less, 0.95 or more and 1.60 or less, 1.00 or more and 1.90 or less, 1.00 or more and 1.75 or less, 1.00 or more and 1.65 or less, and 1.00 or more and 1.60 or less.

In the present specification, Ssk and Sa are measured in a 0.26 mm×0.26 mm region (Lx and Ly in the formulae (a) to (c) are 0.26 mm). The vertical and horizontal lengths of the region where Ssk and Sa are measured may not completely coincide with each other and may have a slight difference. A measurement region in examples is 258 μm×259 μm. In addition, in the present specification, Ssk and Sa mean values measured without setting the cutoff value.

Ssk and Sa can be measured with, for example, a laser microscope-type surface shape measuring instrument. Examples of the laser microscope-type surface shape measuring instrument include trade name "LEXT OLS4000" manufactured by Olympus Corporation.

<<Formula 2-2>>

In the uneven layer, Ssk preferably satisfies the following formula 2-2.

$$0.10 \leq Ssk \leq 1.50 \tag{2-2}$$

When Ssk is set to 0.10 or more and 1.50 or less, it is possible to make it easy for the formula 2-1 to be satisfied.

Ssk is more preferably 0.12 or more and still more preferably 0.15 or more. In addition, Ssk is preferably 1.00 or less, more preferably 0.90 or less, more preferably 0.70 or less, and more preferably 0.55 or less.

Examples of an embodiment of the range of Ssk include 0.10 or more and 1.50 or less, 0.10 or more and 1.00 or less, 0.10 or more and 0.90 or less, 0.10 or more and 0.70 or less, 0.10 or more and 0.55 or less, 0.12 or more and 1.50 or less, 0.12 or more and 1.00 or less, 0.12 or more and 0.90 or less, 0.12 or more and 0.70 or less, 0.12 or more and 0.55 or less, 0.15 or more and 1.50 or less, 0.15 or more and 1.00 or less, 0.15 or more and 0.90 or less, 0.15 or more and 0.70 or less, and 0.15 or more and 0.55 or less.

<<Formula 2-3>>

In the uneven layer, Sa preferably satisfies the following formula 2-3.

$$0.020 \ \mu m \leq Sa \leq 0.200 \ \mu m \quad (2\text{-}3)$$

When Sa is set to 0.020 μm or more and 0.200 μm or less, it is possible to make it easy for the formula 2-1 to be satisfied.

Sa is more preferably 0.030 μm or more and still more preferably 0.040 μm or more. In addition, Sa is more preferably 0.150 μm or less, still more preferably 0.100 μm or less, and far still more preferably 0.085 μm or less.

Examples of an embodiment of the range of Sa include 0.020 μm or more and 0.200 μm or less, 0.020 μm or more and 0.150 μm or less, 0.020 μm or more and 0.100 μm or less, 0.020 μm or more and 0.085 μm or less, 0.030 μm or more and 0.200 μm or less, 0.030 μm or more and 0.150 μm or less, 0.030 μm or more and 0.100 μm or less, 0.030 μm or more and 0.085 μm or less, 0.040 μm or more and 0.200 μm or less, 0.040 μm or more and 0.150 μm or less, 0.040 μm or more and 0.100 μm or less, and 0.040 μm or more and 0.085 μm or less.

The uneven layer preferably contains a binder resin and particles.

<<Binder Resin>>

The binder resin preferably contains a cured product of a curable resin composition. Examples of the cured product of a curable resin composition include cured products of a thermosetting resin composition and cured products of an ionizing radiation curable resin composition, and a cured product of an ionizing radiation curable resin composition is preferable in order to further improve the mechanical strength.

The proportion of the cured product of a curable resin composition in the entire binder resin of the uneven layer is preferably 60 mass % or more, more preferably 80 mass % or more, still more preferably 90 mass % or more, and far still more preferably 100 mass %.

The thermosetting resin composition is a composition containing at least a thermosetting resin and is a resin composition that is cured by heating.

Examples of the thermosetting resin include an acrylic resin, a urethane resin, a phenolic resin, an urea melamine resin, an epoxy resin, an unsaturated polyester resin, a silicone resin, and the like. In the thermosetting resin composition, a curing agent is added to these curable resins as necessary.

The ionizing radiation curable resin composition is a composition containing a compound having an ionizing radiation curable functional group. In the present specification, "compound having an ionizing radiation curable functional group" may be referred to as "ionizing radiation curable compound".

Ionizing radiation means an electromagnetic wave or charged particle beam having an energy quantum capable of polymerizing or crosslinking molecules, normally, an ultraviolet ray or an electron beam is used; however, additionally, electromagnetic waves such as an X-ray and a γ-ray and charged particle beams such as an x-ray and an ion beam also can be used.

Examples of the ionizing radiation curable functional group include ethylenically unsaturated bond groups such as a (meth)acryloyl group, a vinyl group, and an allyl group, an epoxy group, an oxetanyl group, and the like. The ionizing radiation curable compound is preferably a compound having an ethylenically unsaturated bond group, more preferably a compound having two or more ethylenically unsaturated bond groups, and still more preferably a polyfunctional (meth)acrylate-based compound having two or more ethylenically unsaturated bond groups.

As the polyfunctional (meth)acrylate-based compound, any of monomers and oligomers can be used, but an oligomer is preferably contained. That is, the uneven layer preferably contains a cured product of a polyfunctional (meth)acrylate oligomer as the binder resin. The cured product of a polyfunctional (meth)acrylate oligomer is capable of suppressing the excessive cure shrinkage of the uneven layer while improving the surface hardness of the optical laminate and is thus capable of suppressing the elevation differences of the unevenness of the uneven layer containing particles becoming excessive. Therefore, when the uneven layer contains the cured product of a polyfunctional (meth)acrylate oligomer, it is possible to make it easy to suppress Ssk and Sa becoming excessively large.

On the other hand, since the oligomer has a high viscosity compared with monomers, there are cases where the levelling property of a coating liquid for the uneven layer deteriorates and Ssk becomes high. Therefore, as the polyfunctional (meth)acrylate-based compound, an oligomer and a monomer are more preferably contained. That is, the uneven layer preferably contains a cured product of a polyfunctional (meth)acrylate oligomer and a cured product of a polyfunctional (meth)acrylate monomer as the binder resin.

In a case where an oligomer and a monomer are used as the polyfunctional (meth)acrylate-based compound, the mass ratio between the oligomer and the monomer is preferably 20:80 to 80:20, more preferably 20:80 to 60:40 or 40:60 to 80:20, and still more preferably 40:60 to 60:40.

Examples of the polyfunctional (meth)acrylate oligomer include (meth)acrylate-based polymers such as urethane (meth)acrylate, epoxy (meth)acrylate, polyester (meth)acrylate, and polyether (meth)acrylate and the like.

The urethane (meth)acrylate can be obtained by, for example, a reaction between a polyhydric alcohol and an organic diisocyanate and hydroxy (meth)acrylate.

The lower limit of the weight-average molecular weight of the polyfunctional (meth)acrylate oligomer is preferably 500 or more and more preferably 1000 or more, and the upper limit is preferably 5000 or less and more preferably 3000 or less.

When the weight-average molecular weight of the oligomer is set to 500 or more, it is possible to make it easy to suppress the excessive cure shrinkage of the uneven layer. In addition, when the weight-average molecular weight of the oligomer is set to 5000 or less, it is possible to make it easy to suppress an excessive increase in Ssk due to the deterioration of the levelling property of the coating liquid for the uneven layer.

Examples of an embodiment of the range of the weight-average molecular weight of the functional (meth)acrylate oligomer include 500 or more and 5000 or less, 500 or more and 3000 or less, 1000 or more and 5000 or less, and 1000 or more and 3000 or less.

In the present specification, the weight-average molecular weight and the number-average molecular weight mean polystyrene-equivalent values measured by gel permeation chromatography.

Among polyfunctional (meth)acrylate-based compounds, examples of bifunctional (meth)acrylate monomer include ethylene glycol di(meth)acrylate, bisphenol A tetraethoxy diacrylate, bisphenol A tetrapropoxy diacrylate, 1,6-hexanediol diacrylate, and the like.

Examples of tri- or higher-functional (meth)acrylate monomer include trimethylolpropane tri (meth)acrylate, pentaerythritol tri (meth)acrylate, pentaerythritol tetra(meth)acrylate, dipentaerythritol hexa (meth)acrylate, dipentaerythritol tetra(meth)acrylate, isocyanuric acid-modified tri (meth)acrylate, and the like.

The (meth)acrylate monomer may be a monomer having a partially modified molecular skeleton. For example, (meth)acrylate monomers modified with ethylene oxide, propylene oxide, caprolactone, isocyanuric acid, an alkyl, a cyclic alkyl, aromatic, bisphenol, or the like can also be used.

In addition, for the purpose of adjusting the viscosity of the coating liquid for the uneven layer, a monofunctional (meth)acrylate may be added as the ionizing radiation curable compound.

Examples of the monofunctional (meth)acrylate include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, isobornyl (meth)acrylate, and the like.

One ionizing radiation curable compound can be used singly or two or more ionizing radiation compounds can be used in combination.

In addition, to the coating liquid for the uneven layer, in addition to the ionizing radiation curable compound, a polymer may be added in order to adjust the viscosity. Examples of the polymer include polymers having a weight-average molecular weight of more than 5,000 and 200,000 or less.

In a case where the ionizing radiation curable composition is an ultraviolet curable compound, the ionizing radiation curable compound preferably contains an additive such as a photopolymerization initiator or a photopolymerization accelerator.

Examples of the photopolymerization initiator include one or more selected from the group of acetophenone, benzophenone, α-hydroxyalkylphenone, Michler's ketone, benzoin, benzyl dimethyl ketal, benzoyl benzoate, α-acyloxime ester, anthraquinone, halogenoketone, thioxanthones, and the like. Among these, α-hydroxyalkylphenone that is less likely to yellow is preferable.

The photopolymerization accelerator is an agent capable of increasing the curing rate by mitigating polymerization inhibition caused by an air during curing, and examples thereof include one or more selected from the group of p-dimethylaminobenzoic acid isoamyl ester, p-dimethylaminobenzoic acid ethyl ester, and the like.

<<Particles>>

Examples of the particles include organic particles, inorganic particles, metal particles, and the like. Among these, organic particles and inorganic particles are preferable.

Examples of the organic particles include particles made of polymethyl methacrylate, a polyacrylic styrene copolymer, a melamine resin, polycarbonate, polystyrene, polyvinyl chloride, a benzoguanamine-melamine-formaldehyde condensate, silicone, a fluororesin, a polyester-based resin, or the like. The organic particles have favorable dispersibility and thus make it easy to control Sa and Ssk, which is preferable.

Regarding the average particle size of the organic particles, the lower limit is preferably 0.5 μm or more, more preferably 1.0 μm or more, and still more preferably 2.0 μm or more, and the upper limit is preferably 5.0 μm or less, more preferably 4.0 μm or less, and still more preferably 3.0 μm or less.

When the average particle size of the organic particles is set to 0.5 μm or more, it is possible to make it easy to suppress Sa becoming excessively low. In addition, in a case where the mass-based contents of the organic particles are the same as each other, as the average particle diameter increases, the number of the organic particles decreases. Therefore, when the average particle size of the organic particles is too large, there is a tendency that independent sharp protrusion portions are likely to be formed and thereby Ssk becomes large. Therefore, when the average particle size of the organic particles is 5.0 μm or less, it is possible to make it easy to suppress Ssk becoming excessively large.

Examples of an embodiment of the range of the average particle size of the organic particles include 0.5 μm or more and 5.0 μm or less, 0.5 μm or more and 4.0 μm or less, 0.5 μm or more and 3.0 μm or less, 1.0 μm or more and 5.0 μm or less, 1.0 μm or more and 4.0 μm or less, 1.0 μm or more and 3.0 μm or less, 2.0 μm or more and 5.0 μm or less, 2.0 μm or more and 4.0 μm or less, and 2.0 μm or more and 3.0 μm or less.

The average particle size of the organic particles can be calculated by, for example, the following operations (A1) to (A3).

(A1) A transmission observation image of the optical laminate is captured with an optical microscope. The magnification is preferably 500 times or more and 2000 times or less.

(A2) 10 Arbitrary organic particles are extracted from the observation image, and then the particle size of each organic particle is calculated. The particle size is measured as follows: a cross section of the particle is sandwiched by a plurality of combinations of two parallel straight lines, and the distance between the straight lines is measured for the combination of two straight lines between which the distance is maximized.

(A3) The same operations are performed five times on the observation images on different screens of the same sample, and the value that is obtained from the number average of the particle diameters of a total of 50 particles is regarded as the average particle diameter of the organic particles.

For the organic particles, the coefficient of variation of the particle sizes is preferably 13% or less, more preferably 12% or less, and still more preferably 11% or less.

When the coefficient of variation of the particle sizes of the organic particles is set to 13% or less, it is possible to make it easy to control Sa and Ssk.

The coefficient of variation of the particle sizes of the organic particles can be obtained by the following formula from the standard deviation calculated from the 50 particles used in the calculation of the average particle size of (A1) to (A3) and the average particle diameter.

Coefficient of variation (%)=(standard deviation/average particle size)×100

Examples of the inorganic particles include particles made of silica, alumina, zirconia, titania, or the like. Among these, silica is preferable in order to improve the transparency. In addition, the silica is preferably fumed silica.

Fumed silica is amorphous silica having particle sizes of 200 nm or less produced by a dry method and can be obtained by reacting a volatile compound containing silicon in a gas phase. Specific examples thereof include silica generated by hydrolyzing a silicon compound such as silicon tetrachloride in a flame of oxygen and hydrogen and the like. Fumed silica is preferable since it is easy to perform a hydrophobic treatment on the surface.

In a case where the inorganic particles are used singly, it is preferable that a plurality of the inorganic particles agglomerate to form agglomerates and the agglomerates impart unevenness to the uneven layer.

In addition, when a hydrophobic treatment is performed on the inorganic particles, it is also possible to make the inorganic particles form agglomerates so as to cling to the organic particles. Therefore, when a system where the organic particles are used singly or a system where the organic particles and the inorganic particles are jointly used are compared with each other, there is a tendency that Sa becomes large in the system where the organic particles and the inorganic particles are jointly used. On the other hand, since the inorganic particles form gentle unevenness, when the system where the organic particles are used singly or the system where the organic particles and the inorganic particles are jointly used are compared with each other, there is a tendency that Ssk becomes small in the system where the organic particles and the inorganic particles are jointly used.

In a case where the inorganic particles are used singly, compared with a case where the organic particles are used singly, there is a tendency that the heights of the protrusion portions are low and the uneven shape becomes gentle as a whole.

The inorganic particles preferably have surfaces that have been hydrophobilized. When a hydrophobic treatment is performed on the surfaces of the inorganic particles, it is possible to suppress the excessive agglomeration of the inorganic particles. In addition, when the inorganic particles having hydrophobilized surfaces and the organic particles are jointly used, it is possible to make it easy to increase Sa and Ssk as described above.

The inorganic particles having hydrophobilized surfaces are inorganic particles having a reaction product of a functional group on the surface of the inorganic particle and a surface treatment agent on the surfaces of the inorganic particles. Examples of the functional group on the surface of the inorganic particle include a silanol group of a silica particle.

Examples of the surface treatment agent include one or more selected from the group of trimethylsilyl chloride, dimethyldichlorosilane, trimethylsilyltrifluoromethanesulfonate, chloromethyltrimethylsilane, hexamethyldisilazane, triethylsilane, triethylsilyl chloride, triisopropylsilyl chloride, t-butyldimethylsilane, t-butyldimethylsilyl chloride, octylsilane, hexadecylsilane, allyltrimethylsilane, trimethylvinylsilane, aminosilane, methacrylsilane, polydimethylsiloxane, and the like.

The surface treatment agent preferably has an alkyl group having a number of carbon atoms in the molecule in order to increase the degree of hydrophobization. Specifically, the surface treatment agent preferably has an alkyl group having 5 or more carbon atoms in the molecule and more preferably has an alkyl group having 6 or more carbon atoms in the molecule. The alkyl group may be a straight chain or may have a branch, but is preferably a straight chain.

When the number of carbon atoms in the alkyl group in the molecule is too large, due to an influence of the bulkiness of the molecules of the surface treatment agent, the proportion of the functional groups on the surfaces of the inorganic particles and the surface treatment agent that can react with each other decreases. Therefore, the number of carbon atoms in the alkyl group of the surface treatment agent is preferably 20 or less, more preferably 16 or less, and still more preferably 12 or less.

In a case where the inorganic particles are used singly as the particles, it is also preferable to jointly use inorganic particles that have been hydrophobilized with different surface treatment agents. This is because, in a case where only inorganic particles that have been hydrophobilized with the same surface treatment agent are used, there are cases where the inorganic particles agglomerate excessively due to the common properties.

In a case where inorganic particles that have been hydrophobilized with different surface treatment agents are jointly used, regarding the number of carbon atoms in an alkyl group of a surface treatment agent for one kind of the inorganic particles, the lower limit is preferably 4 or more and more preferably 6 or more, and the upper limit is preferably 20 or less, more preferably 16 or less, and still more preferably 12 or less. Examples of an embodiment of the range of the number of carbon atoms in the alkyl group of the surface treatment agent for one kind of the inorganic particles include 4 or more and 20 or less, 4 or more and 16 or less, 4 or more and 12 or less, 6 or more and 20 or less, 6 or more and 16 or less, and 6 or more and 12 or less. The number of carbon atoms in an alkyl group of a surface treatment agent for the other kind of the inorganic particles is preferably 3 or less, more preferably 2 or less, and still more preferably 1.

Regarding the average particle size of the inorganic particles, the lower limit is preferably 3 nm or more, more preferably 5 nm or more, and still more preferably 8 nm or more, and the upper limit is preferably 100 nm or less, more preferably 50 nm or less, and still more preferably 30 nm or less.

Examples of an embodiment of the range of the average particle size of the inorganic particles include 3 nm or more and 100 nm or less, 3 nm or more and 50 nm or less, 3 nm or more and 30 nm or less, 5 nm or more and 100 nm or less, 5 nm or more and 50 nm or less, 5 nm or more and 30 nm or less, 8 nm or more and 100 nm or less, 8 nm or more and 50 nm or less, and 8 nm or more and 30 nm or less.

When the average particle size of the inorganic particles is set to the above-described range, it is possible to make it easy to control the uneven shape formed by the agglomerates of the inorganic particles. Unless particularly otherwise described, the average particle size of the inorganic particles in the present specification means the average primary particle size. The average particle size of the inorganic particles can be measured by, for example, a laser scattering method.

Examples of the metal particles include particles made of a metal itself such as gold or silver and metal-coated particles obtained by coating the surfaces of the organic particles with a metal. The metal particles have a heavy specific weight and do not easily float on the surface of the uneven layer and thus have a difficulty in increasing Sa. In addition, since the metal particles have a low affinity to the binder resin, the projection portions of the metal particles projecting from the surface of the uneven layer are not coated with a resin and form sharp protrusion portions. Therefore, with the metal particles, there is a tendency that it is difficult to increase Sa and Ssk becomes extremely large.

Based on what has been described above, the uneven layer preferably does not substantially contain the metal particles.

Examples of the shape of the particle include a spherical shape, an elliptical shape, an irregular shape, and the like, and a spherical shape is preferable. Since spherical particles easily suppress the uneven shape of the uneven layer becoming sharp, it is possible to make it easy to suppress Ssk becoming excessively large.

Regarding the content of the particles, with respect to 100 parts by mass of the binder resin, the lower limit is preferably 0.3 parts by mass or more, more preferably 0.4 parts by mass or more, and still more preferably 0.5 parts by mass or more, and the upper limit is preferably 12.0 parts by mass or less, more preferably 11.0 parts by mass or less, and still more preferably 10.0 parts by mass or less.

When the content of the particles is set to 0.3 parts by mass or more, it is possible to make it easy to suppress Sa of the uneven layer becoming excessively small and Ssk becoming excessively large. In addition, when the content of the particles is set to 12.0 parts by mass or less, it is possible to make it easy to suppress Sa of the uneven layer becoming excessively large. In addition, in a case where the particles are the organic particles, when the content of the particles is set to 12.0 parts by mass or less, it is also possible to make it easy to suppress Ssk becoming excessively small.

Examples of an embodiment of the range of the content of the particles with respect to 100 parts by mass of the binder resin include 0.3 parts by mass or more and 12.0 parts by mass or less, 0.3 parts by mass or more and 11.0 parts by mass or less, 0.3 parts by mass or more and 10.0 parts by mass or less, 0.4 parts by mass or more and 12.0 parts by mass or less, 0.4 parts by mass or more and 11.0 parts by mass or less, 0.4 parts by mass or more and 10.0 parts by mass or less, 0.5 parts by mass or more and 12.0 parts by mass or less, 0.5 parts by mass or more and 11.0 parts by mass or less, and 0.5 parts by mass or more and 10.0 parts by mass or less.

Regarding the average film thickness of the uneven layer, the lower limit is preferably 0.5 μm or more, more preferably 0.7 μm or more, and still more preferably 1.0 μm or more, and the upper limit is preferably 7.0 μm or less, more preferably 5.0 μm or less, and still more preferably 3.0 μm or less.

When the average film thickness of the uneven layer is set to 0.5 μm or more, it is possible to make it easy to suppress Sa of the uneven layer becoming excessively large and Ssk becoming excessively large. In addition, when the average film thickness of the uneven layer is set to 7.0 μm or less, it is possible to make it easy to suppress Sa of the uneven layer becoming excessively small and Ssk becoming excessively small.

Examples of an embodiment of the range of the average film thickness of the uneven layer include 0.5 μm or more and 7.0 μm or less, 0.5 μm or more and 5.0 μm or less, 0.5 μm or more and 3.0 μm or less, 0.7 μm or more and 7.0 μm or less, 0.7 μm or more and 5.0 μm or less, 0.7 μm or more and 3.0 μm or less, 1.0 μm or more and 7.0 μm or less, 1.0 μm or more and 5.0 μm or less, and 1.0 μm or more and 3.0 μm or less.

The average film thickness of each layer that configures the optical laminate, such as the uneven layer or the antifouling layer, can be calculated from, for example, the average value of the film thicknesses at 20 arbitrary sites on a cross-sectional photograph of the optical laminate captured with a scanning transmission electron microscope (STEM). Here, the 20 sites are selected in a manner that the places are not biased.

The accelerating voltage and magnification of STEM may be set depending on the measurement subject layer. For example, in the case of the uneven layer, it is preferable to set the accelerating voltage of STEM to 10 kV or higher and 30 kV or lower and to set the magnification of STEM to 1000 times or more and 7000 times or less.

The uneven layer may contain other additives to an extent that the effect of the present disclosure is not impaired. Examples of the additives include a leveling agent, an ultraviolet absorber, an antioxidant, a light stabilizer, and the like.

Regarding the refractive index of the uneven layer, the lower limit is preferably 1.48 or more, more preferably 1.50 or more, and still more preferably 1.52 or more, and the upper limit is preferably 1.58 or less, more preferably 1.54 or less, and still more preferably 1.53 or less. When the refractive index of the uneven layer is set to the above-described range and the refractive index of the antifouling layer is set to a range to be described below, it is possible to make it easy to decrease a luminous reflectance Y value.

Examples of an embodiment of the range of the refractive index of the uneven layer include 1.48 or more and 1.58 or less, 1.48 or more and 1.54 or less, 1.48 or more and 1.53 or less, 1.50 or more and 1.58 or less, 1.50 or more and 1.54 or less, 1.50 or more and 1.53 or less, 1.52 or more and 1.58 or less, 1.52 or more and 1.54 or less, and 1.52 or more and 1.53 or less.

<<Solvent>>

In the coating liquid for the uneven layer, normally, a solvent is used in order to adjust the viscosity or enable each component to be dissolved or dispersed.

As the solvent, for example, ketones such as acetone, methyl ethyl ketone, methyl isobutyl ketone, and cyclohexanone; ethers such as dioxane and tetrahydrofuran; aliphatic hydrocarbons such as hexane; alicyclic hydrocarbons such as cyclohexane; aromatic hydrocarbons such as toluene and xylene, halogenated carbons such as dichloromethane and dichloroethane; esters such as methyl acetate, ethyl acetate, and butyl acetate; alcohols such as isopropanol, butanol, and cyclohexanol; cellosolves such as methyl cellosolve and ethyl cellosolve; glycol ethers such as propylene glycol monomethyl ether acetate; cellosolve acetates; sulfoxides such as dimethylsulfoxide; amides such as dimethylformamide and dimethylacetamide; and the like can be exemplified, and the solvent may be a mixture thereof.

When the time necessary to dry the solvent in the coating liquid for the uneven layer is too long, the particles excessively agglomerate, and thereby there are cases where Ssk becomes too large. In addition, when the time necessary to dry the solvent in the coating liquid for the uneven layer is too short, agglomeration of the particles is insufficient, and thereby there are cases where Sa becomes too small. Therefore, as the solvent in the coating liquid for the uneven layer, a solvent having a fast evaporation rate and a solvent having a slow evaporation rate are preferably mixed and used.

In the present specification, the solvent having a fast evaporation rate means a solvent having an evaporation rate of 100 or higher when the evaporation rate of butyl acetate is regarded as 100. In addition, in the present specification, the solvent having a slow evaporation rate means a solvent having an evaporation rate of lower than 100 when the evaporation rate of butyl acetate is regarded as 100.

In the solvent of the coating liquid for the uneven layer, regarding the solvent having a fast evaporation rate, the lower limit of the evaporation rate is preferably 120 or higher, more preferably 130 or higher, and still more preferably 140 or higher, and the upper limit of the evaporation rate is preferably 400 or lower, more preferably 300 or lower, and still more preferably 220 or lower. Examples of the solvent having a fast evaporation rate include methyl isobutyl ketone having an evaporation rate of 160, methyl ethyl ketone having an evaporation rate of 370, toluene having an evaporation rate of 200, and 2-propanol having an evaporation rate of 150.

Examples of an embodiment of the range of the evaporation rate of the solvent having a fast evaporation rate include 120 or more and 400 or less, 120 or more and 300 or less, 120 or more and 220 or less, 130 or more and 400 or less, 130 or more and 300 or less, 130 or more and 220 or less, 140 or more and 400 or less, 140 or more and 300 or less, and 140 or more and 220 or less.

In the solvent of the coating liquid for the uneven layer, regarding the solvent having a slow evaporation rate, the lower limit of the evaporation rate is preferably 15 or higher, more preferably 20 or higher, and still more preferably 25 or higher, and the upper limit of the evaporation rate is preferably 90 or lower, more preferably 50 or lower, and still more preferably 35 or lower. Examples of the solvent having a slow evaporation rate include cyclohexanone having an evaporation rate of 32 and propylene glycol monomethyl ether acetate having an evaporation rate of 44.

Examples of an embodiment of the range of the evaporation rate of the solvent having a slow evaporation rate include 15 or more and 90 or less, 15 or more and 50 or less, 15 or more and 35 or less, 20 or more and 90 or less, 20 or more and 50 or less, 20 or more and 35 or less, 25 or more and 90 or less, 25 or more and 50 or less, and 25 or more and 35 or less.

In the solvent of the coating liquid for the uneven layer, the mass ratio between the solvent having a fast evaporation rate and the solvent having a slow evaporation rate is preferably 50:50 to 90:10, more preferably 50:50 to 80:20 or 60:40 to 90:10, and still more preferably 60:40 to 80:20.

In addition, regarding the content of the solvent in the coating liquid for the uneven layer, the lower limit of the solid content concentration is preferably 30 mass % or more and more preferably 35 mass % or more. In addition, regarding the content of the solvent in the coating liquid for the uneven layer, the upper limit of the solid content concentration is preferably 70 mass % or less and more preferably 45 mass % or less.

Examples of an embodiment of the range of the content of the solvent in the coating liquid for the uneven layer include 30 mass % or more and 70 mass % or less, 30 mass % or more and 45 mass % or less, 35 mass % or more and 70 mass % or less, and 35 mass % or more and 45 mass % or less.

<<Antifouling Layer>>

The antifouling layer is a layer that is positioned on the surface of the uneven layer opposite to the easy adhesive layer. The antifouling layer is preferably formed in contact with the uneven layer. That is, a different layer is preferably not provided between the uneven layer and the antifouling layer. In addition, the antifouling layer is preferably disposed so as to become the surface of the optical laminate.

Normally, large stress is generated when a different member has come into contact with the surface of the laminate. Therefore, when a different member has come into contact with the surface of the laminate having functional layers, such as the easy adhesive layer and the uneven layer, on the polyester film having a high degree of plane orientation ΔP, peeling occurs between the polyester film and the easy adhesive layer due to the stress. As the stress, stress in the horizontal direction has a large influence.

However, in a case where a different member has come into contact with the surface of the optical laminate of the present disclosure on the antifouling layer side, since the different member slides due to the antifouling function of the antifouling layer, stress in the horizontal direction is less likely to be generated. Furthermore, since unevenness attributed to the uneven layer satisfying the formula 2-1 is formed on the surface of the optical laminate of the present disclosure on the antifouling layer side, the unevenness makes it difficult for a different member to stick to the surface of the optical laminate and makes it difficult for stress to be generated. Due to these facts, the optical laminate of the present disclosure becomes favorable in terms of interlayer adhesion as the entire optical laminate, and it is possible to suppress the peeling of the functional layers, such as the easy adhesive layer and the uneven layer, formed on the polyester film having a high degree of plane orientation ΔP.

In addition, in the optical laminate of the present disclosure, since the antifouling layer is formed on the uneven layer satisfying the formula 2-1, it is possible to suppress a thickness variation of the antifouling layer and, furthermore, to suppress the generation of a local defect in the optical laminate.

The antifouling layer can be formed from, for example, a coating liquid for forming the antifouling layer containing a binder resin composition and an antifouling agent. That is, as an embodiment of the antifouling layer, an antifouling layer containing a binder resin and an antifouling agent is exemplified.

The binder resin in the antifouling layer preferably contains a cured product of a curable resin composition. Examples of the cured product of a curable resin composition include cured products of a thermosetting resin composition and cured products of an ionizing radiation curable resin composition. Among the cured products of a curable resin composition, a cured product of an ionizing radiation curable resin composition is preferable in order to further improve the mechanical strength.

Examples of the curable resin composition in the antifouling layer include the curable resin compositions exemplified in the section of the uneven layer.

The resin composition that forms the antifouling layer preferably contains a resin composition containing a fluorine atom in the configuration unit and a resin composition containing a siloxane bond in the configuration unit in order to improve the antifouling properties. These resin compositions are preferably curable.

In the case of using the resin composition containing a fluorine atom in the configuration unit or the resin composition containing a siloxane bond in the configuration unit, it is preferable to jointly use this resin composition with a different resin composition. As the resin composition other than the resin composition containing a fluorine atom in the configuration unit and the resin composition containing a siloxane bond in the configuration unit, a curable resin composition is preferable.

The proportion of the cured product of a curable resin composition in the entire binder resin of the antifouling layer is preferably 60 mass % or more, more preferably 80 mass % or more, and still more preferably 90 mass % or more.

Examples of the antifouling agent include a fluorine leveling agent and a silicone-based leveling agent.

The antifouling agent preferably has a reactive group capable of reacting with the binder resin composition in order to suppress bleed out from the antifouling layer. In other words, in the antifouling layer, the antifouling agent is preferably fixed to the binder resin composition.

In addition, in order to suppress bleed out from the antifouling layer, a self-crosslinkable antifouling agent is also preferable.

Regarding the content of the antifouling agent in the antifouling layer, with respect to 100 parts by mass of the binder resin in the antifouling layer, the lower limit is preferably 5 parts by mass or more and more preferably 10 parts by mass or more, and the upper limit is preferably 30 parts by mass or less and more preferably 25 parts by mass or less.

Examples of an embodiment of the range of the content of the antifouling agent in the antifouling layer with respect to 100 parts by mass of the binder resin in the antifouling layer include 5 parts by mass or more and 30 parts by mass or less, 5 parts by mass or more and 25 parts by mass or less, 10 parts by mass or more and 30 parts by mass or less, and 10 parts by mass or more and 25 parts by mass or less.

The thickness of the antifouling layer is preferably 200 nm or less, more preferably 150 nm or less, and still more preferably 110 nm or less. When the thickness of the antifouling layer is set to 200 nm or less, it becomes easy to reflect the uneven shape of the uneven layer to the surface of the antifouling layer, and it is possible to make it easy to improve the adhesion of the optical laminate.

When the thickness of the antifouling layer is too thin, there are cases where the in-plane uniformity of the antifouling properties is impaired and the adhesion of the optical laminate deteriorates. In addition, when the thickness of the antifouling layer is too thin, a local defect, such as bright spots, is likely to be generated in the optical laminate. Therefore, the thickness of the antifouling layer is preferably 50 nm or more, more preferably 70 nm or more, and still more preferably 90 nm or more.

Examples of an embodiment of the range of the thickness of the antifouling layer include 200 nm or less, 50 nm or more and 200 nm or less, 50 nm or more and 150 nm or less, 50 nm or more and 110 nm or less, 70 nm or more and 200 nm or less, 70 nm or more and 150 nm or less, 70 nm or more and 110 nm or less, 90 nm or more and 200 nm or less, 90 nm or more and 150 nm or less, and 90 nm or more and 110 nm or less.

In a case where the refractive index of the antifouling layer is decreased as described below, in order to decrease the luminous reflectance Y value, regarding the thickness of the antifouling layer, the lower limit is preferably 80 nm or more, more preferably 85 nm or more, and still more preferably 90 nm, and the upper limit is preferably 120 nm or less, more preferably 110 nm or less, and still more preferably 105 nm or less. At this time, the thickness of the antifouling layer is preferably larger than the average particle size of the particles in the antifouling layer such as hollow particles and non-hollow particles.

Examples of an embodiment of the range of the thickness in the case of decreasing the refractive index of the antifouling layer include 80 nm or more and 120 nm or less, 80 nm or more and 110 nm or less, 80 nm or more and 105 nm or less, 85 nm or more and 120 nm or less, 85 nm or more and 110 nm or less, 85 nm or more and 105 nm or less, 90 nm or more and 120 nm or less, 90 nm or more and 110 nm or less, and 90 nm or more and 105 nm or less.

The contact angle of the surface of the antifouling layer with pure water is preferably 80 degrees or more, more preferably 85 degrees or more, and still more preferably 90 degrees or more. When the contact angle is set to 80 degrees or more, the sliding properties when a different member has come into contact with the surface of the optical laminate becomes favorable, and it is possible to make it easy to improve the adhesion of the optical laminate.

When the contact angle of the antifouling layer with pure water is too large, there are cases where the properties, such as hardness, of the antifouling layer deteriorate due to an increase in the proportion of the antifouling agent in the total solid content of the antifouling layer. Therefore, the contact angle is preferably 130 degrees or less and more preferably 120 degrees or less.

Examples of an embodiment of the range of the contact angle of the antifouling layer with pure water include 80 degrees or more and 130 degrees or less, 80 degrees or more and 120 degrees or less, 85 degrees or more and 130 degrees or less, 85 degrees or more and 120 degrees or less, 90 degrees or more and 130 degrees or less, and 90 degree or more and 120 degrees or less. In the present specification, the contact angle means the static contact angle measured by a θ/2 method.

As the pure water, versatile pure water can be used. Generally, the specific resistance value of pure water is 0.1 MΩ·cm or more and 15 MΩ·cm or less.

The refractive index of the antifouling layer may be decreased.

Specifically, regarding the refractive index of the antifouling layer, the lower limit is preferably 1.10 or more, more preferably 1.20 or more, more preferably 1.26 or more, more preferably 1.28 or more, and more preferably 1.30 or more, and the upper limit is preferably 1.48 or less, more preferably 1.45 or less, more preferably 1.40 or less, more preferably 1.38 or less, and more preferably 1.32 or less. When the refractive index of the antifouling layer is set to the above-described range, it is possible to make it easy to decrease the luminous reflectance Y value.

Examples of an embodiment of the range of the refractive index of the antifouling layer include 1.10 or more and 1.48 or less, 1.10 or more and 1.45 or less, 1.10 or more and 1.40 or less, 1.10 or more and 1.38 or less, 1.10 or more and 1.32 or less, 1.20 or more and 1.48 or less, 1.20 or more and 1.45 or less, 1.20 or more and 1.40 or less, 1.20 or more and 1.38 or less, 1.20 or more and 1.32 or less, 1.26 or more and 1.48 or less, 1.26 or more and 1.45 or less, 1.26 or more and 1.40 or less, 1.26 or more and 1.38 or less, 1.26 or more and 1.32 or less, 1.28 or more and 1.48 or less, 1.28 or more and 1.45 or less, 1.28 or more and 1.40 or less, 1.28 or more and 1.38 or less, 1.28 or more and 1.32 or less, 1.30 or more and 1.48 or less, 1.30 or more and 1.45 or less, 1.30 or more and 1.40 or less, 1.30 or more and 1.38 or less, and 1.30 or more and 1.32 or less.

In a case where the refractive index of the antifouling layer is decreased, the antifouling layer preferably contains particles.

As the particles in the antifouling layer, hollow particles and non-hollow particles are preferably contained. That is, the antifouling layer having a low refractive index preferably contains the binder resin, hollow particles, and non-hollow particles.

<<Hollow Particles and Non-Hollow Particles>>

The materials of the hollow particles and the non-hollow particles may be any of an inorganic compound such as silica and magnesium fluoride and an organic compound but are preferably silica for low refractive index and strength. Hereinafter, regarding the hollow particles and the non-hollow particles, hollow silica particles and non-hollow silica particles will be mainly described.

The hollow silica particles refer to particles each having an outer shell layer made of silica, with the inside of the particle surrounded by the outer shell layer being a cavity and the inside of the cavity containing air. The hollow silica particles are particles having a refractive index decreasing in proportion to the gas occupancy as compared with the original refractive index of silica by containing air. The non-hollow silica particles are particles the inside of which is not hollow like hollow silica particles. The non-hollow silica particles are, for example, solid silica particles.

The shapes of the hollow silica particles and the non-hollow silica particles are not specifically limited and may be a true sphere, a spheroid, or a substantially spherical shape such as a polyhedral shape that can be approximated to a sphere. Among these, a true sphere, a spheroid, or a substantially spherical shape is preferable, in consideration of the scratch resistance.

The hollow silica particles contain air inside and thus play a role in decreasing the refractive index of the entire antifouling layer. Use of hollow silica particles with an increased proportion of air and a large particle size can decrease the refractive index of the antifouling layer more. Meanwhile, the hollow silica particles tend to have poor mechanical strength. In particular, use of hollow silica particles with an increased proportion of air and a large particle size tends to decrease the scratch resistance of the antifouling layer.

The non-hollow silica particles play a role of improving the scratch resistance of the antifouling layer by being dispersed in the binder resin.

For the hollow silica particles and the non-hollow silica particles, it is preferable to set the average particle sizes of the hollow silica particles and the non-hollow silica particles so that the hollow silica particles are closely spaced and, furthermore, the non-hollow particles can enter between the hollow silica particles.

Specifically, the ratio of the average particle size of the non-hollow silica particles to the average particle size of the hollow silica particles (average particle size of non-hollow silica particles/average particle size of hollow silica particles) is preferably 0.29 or less, more preferably 0.27 or less. When the ratio between the average particle sizes is set to the above-described range, it becomes easy to uniformly disperse the hollow silica particles and the non-hollow silica particles in the film thickness direction of the antifouling layer, and it is possible to make it easy to improve the scratch resistance. The ratio between the average particle sizes is preferably 0.05 or more and more preferably 0.15 or more.

Examples of an embodiment of the range of the ratio between the average particle sizes include 0.05 or more and 0.29 or less, 0.05 or more and 0.27 or less, 0.15 or more and 0.29 or less, and 0.15 or more and 0.27 or less.

Regarding the average particle size of the hollow silica particles, when the optical characteristics and the mechanical strength are taken into account, the lower limit is preferably 50 nm or more and more preferably 60 nm or more, and the upper limit is preferably 100 nm or less and more preferably 80 nm or less. Examples of an embodiment of the range of the average particle size of the hollow silica particles include 50 nm or more and 100 nm or less, 50 nm or more and 80 nm or less, 60 nm or more and 100 nm or less, and 60 nm or more and 80 nm or less.

Regarding the average particle size of the non-hollow silica particles, when the dispersibility is taken into account while preventing the agglomeration of the non-hollow silica particles, the lower limit is preferably 5 nm or more and more preferably 10 nm or more, and the upper limit is preferably 20 nm or less and more preferably 15 nm or less. Examples of an embodiment of the range of the average particle size of the non-hollow silica particles include 5 nm or more and 20 nm or less, 5 nm or more and 15 nm or less, 10 nm or more and 20 nm or less, and 10 nm or more and 15 nm or less.

The surfaces of the hollow silica particles and the non-hollow silica particles are preferably coated with a silane coupling agent. As the silane coupling agent, a silane coupling agent having a (meth)acryloyl group or an epoxy group is preferable.

When a surface treatment is performed on the silica particles with the silane coupling agent, the affinity between the silica particles and the binder resin improves, and the silica particles are less likely to agglomerate. Therefore, the dispersion of the silica particles is likely to become uniform. In addition, when the affinity between the silica particles and the binder resin is improved with the silane coupling agent, the resistance of the antifouling layer in a wet state formed on the protrusion portions of the uneven layer to flowing down toward the flat portions of the uneven layer increases, and thus it is possible to make it easy to suppress the excessive reduction of the film thickness of the antifouling layer on the protrusion portions of the uneven layer. Therefore, it is possible to make it easy to suppress a local defect in the optical laminate.

As the content of the hollow silica particles increases, the filling rate of the hollow silica particles in the binder resin increases, and the refractive index of the antifouling layer decreases. In addition, as the content of the hollow silica particles increases, the viscosity of the coating liquid for the antifouling layer increases, whereby the resistance of the antifouling layer in a wet state formed on the protrusion portions of the uneven layer to flowing down toward the flat portions of the uneven layer increases, and thus it is possible to make it easy to suppress the excessive reduction of the film thickness of the antifouling layer on the protrusion portions of the uneven layer. Therefore, it is possible to make it easy to suppress a local defect in the optical laminate. Therefore, the content of the hollow silica particles is preferably 100 parts by mass or more, more preferably 130 parts by mass or more, with respect to 100 parts by mass of the binder resin.

On the other hand, when the content of the hollow silica particles is too large, there is a tendency that the mechanical strength, such as scratch resistance, of the antifouling layer decreases. In addition, when the content of the hollow silica particles is too large, relatively, the content of the antifouling agent decreases, and thus there is a tendency that the antifouling properties deteriorate. Therefore, the content of the hollow silica particles is preferably 300 parts by mass or less, more preferably 200 parts by mass or less, with respect to 100 parts by mass of the binder resin.

Examples of an embodiment of the range of the content of the hollow silica particles with respect to 100 parts by mass of the binder resin include 100 parts by mass or more and 400 parts by mass or less, 100 parts by mass or more and 300 parts by mass or less, 130 parts by mass or more and 400 parts by mass or less, and 130 parts by mass or more and 300 parts by mass or less.

When the content of the non-hollow silica particles is small, even when the non-hollow silica particles are present on the surface of the antifouling layer, there are cases where the non-hollow silica particles do not affect an increase in hardness. In addition, as the content of the non-hollow silica particles increases, the viscosity of the coating liquid for the antifouling layer increases, whereby the resistance of the antifouling layer in a wet state formed on the protrusion portions of the uneven layer to flowing down toward the flat portions of the uneven layer increases, and thus it is possible to make it easy to suppress the excessive reduction of the film thickness of the antifouling layer on the protrusion portions of the uneven layer. Therefore, it is possible to make it easy to suppress a local defect in the optical laminate. In addition, when the content of the non-hollow silica particles becomes too large, it is possible to make it easy to decrease the influence of a shrinkage variation caused by the polymerization of the binder resin. Therefore, the content of the non-hollow silica particles is preferably 10 parts by mass or more and more preferably 20 parts by mass or more with respect to 100 parts by mass of the binder resin.

On the other hand, when the content of the non-hollow silica particles is too large, relatively, the content of the antifouling agent decreases, and thus there is a tendency that the antifouling properties deteriorate. Therefore, the content of the non-hollow silica particles is preferably 150 parts by mass or less, more preferably 100 parts by mass or less, and still more preferably 50 parts by mass with respect to 100 parts by mass of the binder resin.

Examples of an embodiment of the range of the content of the non-hollow silica particles with respect to 100 parts by mass of the binder resin include 10 parts by mass or more and 150 parts by mass or less, 10 parts by mass or more and 100 parts by mass or less, 10 parts by mass or more and 50 parts by mass or less, 20 parts by mass or more and 150 parts by mass or less, 20 parts by mass or more and 100 parts by mass or less, and 20 parts by mass or more and 50 parts by mass or less.

The antifouling layer may contain other additives to an extent that the effect of the present disclosure is not impaired. Examples of the additives include an ultraviolet absorber, an antioxidant, a light stabilizer, and the like.

<<Solvent>>

In the coating liquid for the antifouling layer, normally, a solvent is used in order to adjust the viscosity or enable each component to be dissolved or dispersed.

Examples of the solvent in the coating liquid for the antifouling layer include the same solvents as exemplified as the solvent in the coating liquid for the uneven layer.

When the time necessary to dry the solvent in the coating liquid for the antifouling layer is too long, there are cases where the film thickness of the antifouling layer on the protrusion portions of the uneven layer excessively reduces due to the antifouling layer in a wet state formed on the protrusion portions of the uneven layer excessively flowing down toward the flat portions of the uneven layer. In addition, when the time necessary to dry the solvent in the coating liquid for the antifouling layer is too short, there are cases where the leveling properties of the antifouling layer are insufficient. Therefore, as the solvent in the coating liquid for the antifouling layer, a solvent having a fast evaporation rate and a solvent having a slow evaporation rate are preferably mixed and used.

In the solvent of the coating liquid for the antifouling layer, regarding the solvent having a fast evaporation rate, the lower limit of the evaporation rate is preferably 125 or higher, more preferably 130 or higher, and still more preferably 150 or higher, and the upper limit of the evaporation rate is preferably 450 or lower, more preferably 430 or lower, and still more preferably 400 or lower.

Examples of an embodiment of the range of the evaporation rate of the solvent having a fast evaporation rate include 125 or more and 450 or less, 125 or more and 430 or less, 125 or more and 400 or less, 130 or more and 450 or less, 130 or more and 430 or less, 130 or more and 400 or less, 150 or more and 450 or less, 150 or more and 430 or less, and 150 or more and 400 or less.

In the solvent of the coating liquid for the antifouling layer, regarding the solvent having a slow evaporation rate, the lower limit of the evaporation rate is preferably 20 or higher, more preferably 30 or higher, and still more preferably 40 or higher, and the upper limit of the evaporation rate is preferably 90 or lower, more preferably 60 or lower, and still more preferably 50 or lower.

Examples of an embodiment of the range of the evaporation rate of the solvent having a slow evaporation rate include 20 or more and 90 or less, 20 or more and 60 or less, 20 or more and 50 or less, 30 or more and 90 or less, 30 or more and 60 or less, 30 or more and 50 or less, 40 or more and 90 or less, 40 or more and 60 or less, and 40 or more and 50 or less.

In the solvent of the coating liquid for the antifouling layer, the mass ratio between the solvent having a fast evaporation rate and the solvent having a slow evaporation rate is preferably 50:50 to 90:10, more preferably 50:50 to 80:20 or 60:40 to 90:10, and still more preferably 60:40 to 80:20.

In addition, regarding the content of the solvent in the coating liquid for the antifouling layer, the lower limit of the solid content concentration is preferably 1 mass % or more and more preferably 2 mass % or more. In addition, regarding the content of the solvent in the coating liquid for the antifouling layer, the upper limit of the solid content concentration is preferably 10 mass % or less and more preferably 5 mass % or less.

Examples of an embodiment of the range of the content of the solvent in the coating liquid for the antifouling layer include 1 mass % or more and 10 mass % or less, 1 mass % or more and 5 mass % or less, 2 mass % or more and 10 mass % or less, and 2 mass % or more and 5 mass % or less.

<Properties>

In the optical laminate, the luminous reflectance Y value measured at a light incident angle of 5 degrees from the side where the antifouling layer is present is preferably 3.0% or less and more preferably 2.0% or less. The lower limit of the luminous reflectance Y value is not particularly limited and is normally about 0.5%.

In the present specification, the luminous reflectance Y value refers to the luminous reflectance Y value of the CIE1931 standard colorimetric system. The luminous reflectance Y value can be calculated using a spectrophotometer. At the time of measuring the luminous reflectance, it is preferable to attach a black plate to the rear surface of a base material. Examples of the spectrophotometer include trade name "UV-3600plus" manufactured by Shimadzu Corporation.

As the luminous reflectance Y value, the total light transmittance, and the haze, average values of values measured at 10 sites are used.

In the optical laminate, the total light transmittance as defined in JIS K 7361-1:1997 is preferably 50% or more, more preferably 80% or more, and still more preferably 90% or more.

In the measurement of the total light transmittance and the haze to be described below, the light incident surface is the polyester film side. The total light transmittance and the haze to be described below can be measured with, for example, a haze meter (model No.: HM-150) manufactured by Murakami Color Research Laboratory Co., Ltd.

In the optical laminate, regarding the haze based on JIS K 7136:2000, the lower limit is preferably 0.3% or more, more preferably 0.4% or more, and still more preferably 0.5% or more, and the upper limit is preferably 10% or less, more preferably 7% or less, and still more preferably 5% or less.

Examples of an embodiment of the range of the haze of the optical laminate include 0.3% or more and 10% or less, 0.3% or more and 7% or less, 0.3% or more and 5% or less, 0.4% or more and 10% or less, 0.4% or more and 7% or less, 0.4% or more and 5% or less, 0.5% or more and 10% or less, 0.5% or more and 7% or less, and 0.5% or more and 5% or less.

<Size, Shape, and the Like>

The optical laminate may be a leaf-like form cut to a predetermined size or may be a roll-like form in which a long sheet is wound in a roll shape. The size of the leaf is not particularly limited, but the maximum diameter is about 2 inches or more and 500 inches or less. "Maximum diameter" refers to the maximum length when two arbitrary points of the optical laminate are connected. For example, in a case where the optical laminate is rectangular, the diagonal line of the rectangle becomes the maximum diameter. In a case where the optical laminate is circular, the diameter of the circle becomes the maximum diameter.

The width and length of the roll shape are not particularly limited; however, generally, the width is 500 mm or more and 8000 mm or less, and the length is about 100 m or longer or 10000 m or shorter. The optical laminate in a roll-like form can be used after being cut into a leaf shape in accordance with the size of an image display device or the like. At the time of the cutting, the roll end portions where the properties are not stable are preferably excluded.

The shape of the leaf is also not particularly limited and may be, for example, a polygonal shape such as a triangular shape, a quadrangular shape, or a pentagonal shape, may be a circular shape, or may be a random irregular shape. More specifically, in a case where the optical laminate has a quadrangular shape, the aspect ratio is not particularly limited as long as there is no problem as a display screen. Examples of the aspect ratio (width:length) include 1:1, 4:3, 16:10, 16:9, 2:1, 5:4, 11:8, and the like.

[Polarizing Plate]

A polarizing plate of the present disclosure is a polarizing plate having a polarizer, a first transparent protective plate disposed on one side of the polarizer, and a second transparent protective plate disposed on the other side of the polarizer, in which at least one selected from the group consisting of the first transparent protective plate and the second transparent protective plate is the above-described optical laminate of the present disclosure, and the optical laminate is disposed such that the surface on the antifouling layer side faces opposite to the polarizer.

<Polarizer>

Examples of the polarizer include sheet-type polarizers such as polyvinyl alcohol films, polyvinyl formal films, polyvinyl acetal films, and ethylene-vinyl acetate copolymer-based saponified films, which are dyed with iodine or the like and stretched; wire grid-type polarizers composed of a number of metal wires arranged in parallel; coating-type polarizers to which a lyotropic liquid crystal or a dichroic guest-host material is applied, multilayer thin film type polarizers, and the like. These polarizers may be reflection type polarizers provided with a function of reflecting a polarization component that is not transmitted.

<Transparent Protective Plate>

A first transparent protective plate is disposed on one side of the polarizer, and a second transparent protective plate is disposed on the other side. At least one selected from the group consisting of the first transparent protective plate and the second transparent protective plate is the above-described optical laminate of the present disclosure.

As the first transparent protective plate and the second transparent protective plate that is not the optical laminate, a plastic film, glass, and the like are exemplified. Examples of the plastic film include a polyester film, a polycarbonate film, a cycloolefin polymer film, and an acrylic film, and stretched films thereof are preferable in order to improve the mechanical strength. Examples of the glass include alkali glass, nitride glass, soda lime glass, borosilicate glass, lead glass, and the like. In addition, the glass as the transparent protective plate that protects the polarizer is preferably used as also a different member of an image display device. For example, the glass is preferably used as a glass substrate of a liquid crystal display element and as the transparent protective plate that protects the polarizer.

The polarizer and the transparent protective plate are preferably attached to each other through an adhesive. As the adhesive, a versatile adhesive can be used, and a PVA-based adhesive is preferable.

In the polarizing plate of the present disclosure, the first transparent protective plate and the second transparent protective plate may be both the optical laminate of the present disclosure, but one of the first transparent protective plate and the second transparent protective plate is preferably the above-described optical laminate of the present disclosure. In addition, in a case where the polarizing plate of the present disclosure is used as a polarizing plate that is disposed on a light exit surface side of a display element, the transparent protective plate on the light exit surface side of the polarizer is preferably the above-described optical laminate of the present disclosure. On the other hand, in a case where the polarizing plate of the present disclosure is used as a polarizing plate that is disposed on a side opposite to the light exit surface side of a display element, the transparent protective plate on the side opposite to the light exit surface of the polarizer is preferably the above-described optical laminate of the present disclosure.

[Surface Plate for Image Display Device]

A surface plate for an image display device of the present disclosure is a surface plate for an image display device including an optical laminate attached onto a resin plate or a glass plate, in which the optical laminate is the above-described optical laminate of the present disclosure, and the optical laminate is disposed such that a surface on the antifouling layer side faces opposite to the resin plate or the glass plate.

The surface plate for an image display device is preferably disposed such that the surface to which the optical laminate has been attached faces the surface side. In other words, the surface plate for an image display device is preferably disposed in a manner that the surface to which the optical laminate has been attached faces opposite to a display element.

As the resin plate or the glass plate, it is possible to use resin plates or glass plates that are in versatile use as surface plates for liquid display devices.

The thickness of the resin plate or the glass plate is preferably 10 μm or more in order to improve the strength. The upper limit of the thickness of the resin plate or the glass plate is normally 5000 μm or less; however, in recent years, since the thickness reduction of image display devices has been preferred, the thickness is preferably 1000 μm or less, more preferably 500 μm or less, and still more preferably 100 μm or less.

Examples of an embodiment of the range of the thickness of the resin plate or the glass plate include 10 μm or more and 5000 μm or less, 10 μm or more and 1000 μm or less, 10 μm or more and 500 μm or less, and 10 μm or more and 100 μm or less.

[Image Display Device]

An image display device of the present disclosure is an image display device, in which the above-described optical laminate of the present disclosure is disposed on a display element such that a surface on the antifouling layer side faces opposite to the display element, and the optical laminate is disposed on the surface.

Examples of the display element include liquid crystal display elements, EL display elements such as organic EL display elements and inorganic EL display elements, and plasma display elements, and further include LED display elements such as mini-LED display elements and micro-LED display elements. These display elements may have a touch panel function in the display element.

Examples of a method for displaying liquid crystals of the liquid crystal display element include an IPS method, a VA method, a multi-domain method, an OCB method, a STN method, a TSTN method, and the like. In a case where the display element is a liquid crystal display element, a backlight is required. The backlight is disposed on a side opposite to a side where the optical laminate of the liquid crystal display element is present. Examples of the backlight include backlights in which quantum dots are used and backlights in which a white light-emitting diode is used.

The image display device may be a foldable image display device or a rollable image display device. In addition, the image display device may be an image display device equipped with a touch panel.

EXAMPLES

Hereinafter, the present disclosure will be specifically described using examples and comparative examples. The present disclosure is not limited to forms described in the examples.

1. Evaluation and Measurement

Measurements and evaluations of the following 1-1 to 1-6 were performed on optical laminates obtained in Examples 1 to 20 and Comparative Examples 1 to 21. The results are shown in Tables 1 to 4. Unless particularly otherwise described, regarding an atmosphere during each of the measurements and evaluations, the temperature was set to 23±5° C., the relative humidity was set to 40% or more and 65% or less, and the measurement and the evaluation were performed after a subject sample was exposed to the atmosphere for 30 minutes or longer before the beginning of each of the measurements and evaluations.

1-1. Measurement of Sa and Ssk

In each of the examples and the comparative examples, the surface shape of an uneven layer after the formation of an easy adhesive layer and the uneven layer on a polyester film (PET film) and before the formation of an antifouling layer was measured. From the measured surface shape, Sa, Ssk, and "A" in the formula 2-1 were calculated. In the measurement of the surface shape, a laser microscope (trade name "LEXT OLS4000" manufactured by Olympus Corporation) was used, and the surface shape was measured and determined under the following conditions. Sa and Ssk that were measured with the laser microscope are based on ISO 25178:2012. The results are shown in Tables 1 to 4.

<Measurement Conditions>
Objective lens: MPLAPONLEXT50 (50-times lens)
Zoom: ×1
Image size (pixel): 1024×1024
Image size: 258 μm×259 μm
Cut-off value: Not set <Analysis Conditions>
Analysis mode: Plane
Calculation type: Roughness 1-2. Adhesion The blade of a cutter was inserted from the surface of the optical laminate of each of the examples and the comparative examples on the antifouling layer side, thereby forming 100 notches in a grid shape (number of cuts: 11 notch lines in the vertical and horizontal directions, cut intervals: 1 mm). As the blade of the cutter, product No. "BA-52P" manufactured by NT Incorporated was used. Next, pressure-sensitive adhesive tape (manufactured by Nichiban Co., Ltd., product name "CELLOTAPE (registered trademark)") was stuck to the surface of the optical laminate on which the grid was formed, and a peel test based on a cross cut method prescribed in JIS K 5600 May 6:1999 was performed by peeling the pressure-sensitive adhesive tape. The adhesion of the optical laminate of each of the examples and the comparative examples was evaluated with the following evaluation standards.

<Evaluation Standards>
A: The number of peeled cells is zero, and there are no partially chipped cells.
B: The number of peeled cells is zero, but there are sites where a part of the cell is chipped along the notches and the cell is partially chipped.
C: The number of peeled cells is one or more.

1-3. Bright Spots

The optical laminate of each of the examples and the comparative examples was installed on a horizontal table such that the antifouling layer side faced upward, and the presence or absence of bright spots was visually evaluated at a variety of angles where reflected light of a fluorescent light, which was a lighting, was observed under a bright room environment. The evaluation was performed a straight-line distance of about 50 cm above a sample. The condition of the bright room environment was set such that the illumination on the sample became 500 lux or more and 1000 lux or less. As the lighting, a Hf32-type straight tube three-wavelength daylight white fluorescent lamp was used. As the position of the lighting, a height of 2 m above the horizontal table in the vertical direction was set.

An optical laminate where bright spots did not draw attention was given three points, an optical laminate that did not belong to both cases was given two points, an optical laminate where bright spots drew attention was given one point, and a total of 20 examinees, five examinees from each of the generations of the twenties to the fifties, performed the evaluation. The average point of the evaluations by the 20 examinees was calculated and ranked with the following standards.

<Evaluation Standards>
A: The average point is 2.5 or higher.
B: The average point is 2.0 or higher and lower than 2.5.
C: The average point is lower than 2.0.

1-4. Contact Angle 1.0 μL of pure water was added dropwise onto the surface of the optical laminate of each of the examples and the comparative examples on the antifouling layer side, and the static contact angle after 10 seconds from the landing of the droplet was measured by a θ/2 method using a contact angle meter (manufactured by Kyowa Interface Science Co., Ltd., product No.: DM-300). The measurement was performed three times, and the average value thereof was regarded as the contact angle of each of the examples and the comparative examples.

1-5. Luminous Reflectance Y Value

A black plate (Kuraray Co., Ltd., trade name: COMOGLAS DFA2CG502K (black), thickness: 2 mm) was attached to a base material side of the optical laminate of each of the examples and the comparative examples through a 25 μm-thick transparent pressure-sensitive adhesive layer (manufactured by Panac Co., Ltd., trade name: PANACLEAN PD-S1), thereby producing a 5 cm×5 cm sample.

When a direction perpendicular to the surface of the antifouling layer of the optical laminate was set to zero degrees, light was made incident on the sample at an angle of 5 degrees, and the luminous reflectance Y value, which was the reflectance of the sample, was measured based on the regularly reflected light of the incident light.

As the reflectance, light regularly reflected at an angle of 5 degrees was measured using a spectral reflectance measuring instrument (JASCO Corporation, trade name: V-7100) under conditions of a viewing angle of two degrees, a C light source, and a wavelength range of 380 nm or higher and 780 nm or lower, and then a value that indicated the luminous reflectance Y value, which was calculated with software (JASCO Spectra Manager Ver. 2.0) that converts the measured regularly reflected light into brightness that human beings feel with the eyes, was obtained as the reflectance. The regularly reflected light was measured at 10 sites in the sample, and the average value of the 10 sites was regarded as the reflectance of each of the examples and the comparative examples. In the measurement, a 5 mm×10 mm mask was used. Therefore, the size of a measurement spot of the reflectance at an incident angle of 5 degrees is 50.2 mm².

1-6. Total Light Transmittance (Tt) and Haze (Hz)

Regarding the optical laminate of each of the examples and the comparative examples, the total light transmittance of JIS K 7361-1:1997 and the haze of JIS K 7136:2000 were measured using a haze meter (HM-150, Murakami Color Research Laboratory Co., Ltd.). The light incident surface was the polyester film side.

2. Synthesis of Compound A (Urethane Acrylate Oligomer)

After an air gas was introduced into a reaction container equipped with a stirrer, a thermometer, a cooling pipe, and a nitrogen gas introduction pipe, 10.0 parts by mass of 1,3-butanediol, 10.0 parts by mass of 1,4-butanediol, 0.1 parts by mass of p-methoxyphenol, 0.1 parts by mass of dibutyltin dilaurate, and 100.0 parts by mass of methyl ethyl ketone were charged and heated up to 50° C. under a nitrogen flow while being stirred. Incidentally, 50.3 parts by mass of isophorone diisocyanate was charged into a dripping container and uniformly added dropwise to the reaction container for one hour. At that time, the reaction container temperature was held at 50±3° C. After the temperature was held for one hour under stirring, 0.1 parts by mass of p-methoxyphenol and 0.1 parts by mass of dibutyltin dilaurate were further added thereto, and the components were heated up to 60° C. under a nitrogen flow while being stirred. After that, 176.0 parts by mass of a mixture of pentaerythritol triacrylate and pentaerythritol tetraacrylate in a mass ratio of 80:20 charged into the dripping container was uniformly added dropwise to the reaction container for one hour under stirring.

After the end of the dropwise addition, the dripping container was washed using 120.0 parts by mass of methyl ethyl ketone, and the washed solution was injected into the reaction container as it was. The temperature was further held for two hours under stirring and then raised to 75° C. After that, the temperature was continuously held at 75±3° C. under stirring until a peak derived from isocyanate in an infrared absorption spectrum disappeared. The peak derived from isocyanate disappeared after about four hours to six hours. After the disappearance of this peak was confirmed, the components were decreased to 60° C., 7.0 parts by mass of methanol was added thereto, and the temperature was held at 60±3° C. for 30 minutes. After that, 120.8 parts by mass of methyl ethyl ketone was added thereto, and a transparent resin solution was obtained. Finally, the solvent was removed using an evaporator, and an urethane acrylate oligomer, which was a compound A, was obtained. The weight-average molecular weight of the obtained compound A was 2000.

3. Preparation of Coating Liquid (1) Coating Liquid for Uneven Layer 1

The following materials were diluted with a solvent mixture of methyl isobutyl ketone and methyl ethyl ketone in a mass ratio of 35:65 such that the solid content concentration reached 40 mass %, thereby preparing a coating liquid for an uneven layer 1.

<Materials for Coating Liquid for Uneven Layer 1>
Pentaerythritol triacrylate: 56 Parts by mass
 (Nippon Kayaku Co., Ltd., trade name "PET-30", solid content of 100 mass %)
Ultraviolet curable acrylate-containing composition: 44 Parts by mass
 (DKS Co. Ltd., trade name "NEW FRONTIER R-1403 MB", solid content: 80 mass %)
Photopolymerization initiator: 3 Parts by mass
 (IGM Resins B. V., trade name "Omnirad 184")
Leveling agent: 3 Parts by mass
 (DIC Corporation, trade name "MEGAFACE F-568", solid content of 5 mass %)

(2) Coating Liquid for Uneven Layer 2

The following materials were diluted with a solvent mixture of toluene, 2-propanol, and cyclohexanone in a mass ratio of 60:10:30 such that the solid content concentration reached 40 mass %, thereby preparing a coating liquid for an uneven layer 2.

<Materials for Coating Liquid for Uneven Layer 2>
Pentaerythritol tetraacrylate: 45 Parts by mass
 (trade name: PETA, Daicel-Cytec Company, Ltd.)
Urethane acrylate oligomer: 55 Parts by mass
 (Mitsubishi Chemical Corporation, trade name "UV-1700B", solid content of 100 mass %)
Photopolymerization initiator: 3 Parts by mass
 (IGM Resins B. V., trade name "ESACURE 1")
Organic particles: 0.5 Parts by mass
 (Acrylic beads, average particle size: 2.2 μm, refractive index: 1.559, coefficient of variation: 10.4%)
Leveling agent: 0.5 Parts by mass
 (Dainichiseika Color & Chemicals Mfg. Co., Ltd., trade name "SEIKABEAM 10-28 (TL)", solid content of 10 mass %)

(3) Coating Liquid for Uneven Layer 3

The following materials were diluted with a solvent mixture of toluene, 2-propanol, and cyclohexanone in a mass ratio of 60:10:30 such that the solid content concentration reached 40 mass %, thereby preparing a coating liquid for an uneven layer 3.

<Materials for Coating Liquid for Uneven Layer 3>
Pentaerythritol tetraacrylate: 45 Parts by mass
 (trade name: PETA, Daicel-Cytec Company, Ltd.)
Urethane acrylate oligomer: 55 Parts by mass
 (Mitsubishi Chemical Corporation, trade name "UV-1700B", solid content of 100 mass %)
Photopolymerization initiator: 3 Parts by mass
 (IGM Resins B. V., trade name "ESACURE 1")
Organic particles: 0.6 Parts by mass
 (Acrylic beads, average particle size: 2.2 μm, refractive index: 1.559, coefficient of variation: 10.4%)
Fumed silica: 1 Part by mass (Octylsilane treatment, average particle size of 12 nm, Nippon Aerosil Co., Ltd.)
Leveling agent: 0.5 Parts by mass
(Dainichiseika Color & Chemicals Mfg. Co., Ltd., trade name "SEIKABEAM 10-28 (TL)", solid content of 10 mass %)

(4) Coating Liquid for Uneven Layer 4

The following materials were diluted with a solvent mixture of toluene, 2-propanol, and cyclohexanone in a mass ratio of 60:10:30 such that the solid content concentration reached 40 mass %, thereby preparing a coating liquid for an uneven layer 4.

<Materials for Coating Liquid for Uneven Layer 4>
Pentaerythritol tetraacrylate: 45 Parts by mass
(trade name: PETA, Daicel-Cytec Company, Ltd.)
Urethane acrylate oligomer: 55 Parts by mass
(Mitsubishi Chemical Corporation, trade name "UV-1700B", solid content of 100 mass %)
Photopolymerization initiator: 3 Parts by mass
(IGM Resins B. V., trade name "ESACURE 1")
Fumed silica: 0.5 Parts by mass
(Octylsilane treatment, average particle size of 12 nm, Nippon Aerosil Co., Ltd.)
Fumed silica: 0.2 Parts by mass
(Methylsilane treatment, average particle size of 12 nm, Nippon Aerosil Co., Ltd.)
Leveling agent: 0.5 Parts by mass
(Dainichiseika Color & Chemicals Mfg. Co., Ltd., trade name "SEIKABEAM 10-28 (TL)", solid content of 10 mass %)

(5) Coating Liquid for Uneven Layer 5

The following materials were diluted with a solvent mixture of toluene, 2-propanol, and cyclohexanone in a mass ratio of 60:10:30 such that the solid content concentration reached 40 mass %, thereby preparing a coating liquid for an uneven layer 5.

<Materials for Coating Liquid for Uneven Layer 5>
Pentaerythritol tetraacrylate: 45 Parts by mass
(trade name: PETA, Daicel-Cytec Company, Ltd.)
Urethane acrylate oligomer: 55 Parts by mass
(Mitsubishi Chemical Corporation, trade name "UV-1700B", solid content of 100 mass %)
Photopolymerization initiator: 3 Parts by mass
(IGM Resins B. V., trade name "ESACURE 1")
Organic particles: 3 Parts by mass
(Acrylic beads, average particle size: 2.3 µm, refractive index: 1.559, coefficient of variation: 10.2%)
Fumed silica: 1 Part by mass
(Octylsilane treatment, average particle size of 12 nm, Nippon Aerosil Co., Ltd.)
Leveling agent: 0.5 Parts by mass
(Dainichiseika Color & Chemicals Mfg. Co., Ltd., trade name "SEIKABEAM 10-28 (TL)", solid content of 10 mass %)

(6) Coating Liquid for Uneven Layer 6

The following materials were diluted with a solvent mixture of toluene, 2-propanol, and cyclohexanone in a mass ratio of 60:10:30 such that the solid content concentration reached 40 mass %, thereby preparing a coating liquid for an uneven layer 6.

<Materials for Coating Liquid for Uneven Layer 6>
Pentaerythritol tetraacrylate: 45 Parts by mass
(trade name: PETA, Daicel-Cytec Company, Ltd.)
Urethane acrylate oligomer: 55 Parts by mass
(Mitsubishi Chemical Corporation, trade name "UV-1700B", solid content of 100 mass %)
Photopolymerization initiator: 3 Parts by mass
(IGM Resins B. V., trade name "ESACURE 1")
Organic particles: 10 Parts by mass
(Acrylic beads, average particle size: 3.0 µm, refractive index: 1.559, coefficient of variation: 9.8%)
Leveling agent: 0.5 Parts by mass
(Dainichiseika Color & Chemicals Mfg. Co., Ltd., trade name "SEIKABEAM 10-28 (TL)", solid content of 10 mass %)

(7) Coating Liquid for Uneven Layer 7

The following materials were diluted with a solvent mixture of toluene, 2-propanol, and cyclohexanone in a mass ratio of 60:10:30 such that the solid content concentration reached 40 mass %, thereby preparing a coating liquid for an uneven layer 7.

<Materials for Coating Liquid for Uneven Layer 7>
Pentaerythritol tetraacrylate: 45 Parts by mass
(trade name: PETA, Daicel-Cytec Company, Ltd.)
Urethane acrylate oligomer: 55 Parts by mass
(Mitsubishi Chemical Corporation, trade name "UV-1700B", solid content of 100 mass %)
Photopolymerization initiator: 3 Parts by mass
(IGM Resins B. V., trade name "ESACURE 1")
Organic particles: 15 Parts by mass
(Acrylic beads, average particle size: 3.6 µm, refractive index: 1.559, coefficient of variation: 10.5%)
Metal-coated particles: 0.5 Parts by mass
(Nickel-coated acrylic beads, average particle size: 4.5 µm)
Leveling agent: 0.5 Parts by mass
(Dainichiseika Color & Chemicals Mfg. Co., Ltd., trade name "SEIKABEAM 10-28 (TL)", solid content of 10 mass %)

(8) Coating Liquid for Uneven Layer 8

The following materials were diluted with a solvent mixture of 4-methyl-2-pentanone and 2-propanol in a mass ratio of 70:30 such that the solid content concentration reached 40 mass %, thereby preparing a coating liquid for an uneven layer 8.

<Materials for Coating Liquid for Uneven Layer 8>
Pentaerythritol triacrylate: 100 Parts by mass
(trade name "PET-30", Nippon Kayaku Co., Ltd.)
Photopolymerization initiator: 3 Parts by mass
(IGM Resins B. V., trade name "ESACURE 1")
Metal-coated particles: 0.6 Parts by mass
(Nickel-coated acrylic beads, average particle size: 4.5 µm)
Leveling agent: 0.5 Parts by mass
(Dainichiseika Color & Chemicals Mfg. Co., Ltd., trade name "SEIKABEAM 10-28 (TL)", solid content of 10 mass %)

(9) Coating Liquid for Uneven Layer 9

The following materials were diluted with a solvent mixture of 4-methyl-2-pentanone and 2-propanol in a mass ratio of 70:30 such that the solid content concentration reached 40 mass %, thereby preparing a coating liquid for an uneven layer 9.

<Materials for Coating Liquid for Uneven Layer 9>
Pentaerythritol triacrylate: 100 Parts by mass
(trade name "PET-30", Nippon Kayaku Co., Ltd.)
Photopolymerization initiator: 3 Parts by mass
(IGM Resins B. V., trade name "ESACURE 1")
Leveling agent: 0.5 Parts by mass
(Dainichiseika Color & Chemicals Mfg. Co., Ltd., trade name "SEIKABEAM 10-28 (TL)", solid content of 10 mass %)

(10) Coating Liquid for Uneven Layer 10

The following materials were diluted with a solvent mixture of toluene and cyclohexanone in a mass ratio of 70:30 such that the solid content concentration reached 40 mass %, thereby preparing a coating liquid for an uneven layer 10.

<Materials for Coating Liquid for Uneven Layer 10>
Pentaerythritol tetraacrylate: 45 Parts by mass
(trade name: PETA, Daicel-Cytec Company, Ltd.)
Urethane acrylate oligomer: 55 Parts by mass
(Mitsubishi Chemical Corporation, trade name "UV-1700B", solid content
of 100 mass %)
Photopolymerization initiator: 3 Parts by mass
(IGM Resins B. V., trade name "ESACURE 1")
Organic particles: 15 Parts by mass
(Acrylic beads, average particle size: 3.6 μm, refractive index: 1.559, coefficient of variation: 10.5%)
Leveling agent: 0.5 Parts by mass
(Dainichiseika Color & Chemicals Mfg. Co., Ltd., trade name "SEIKABEAM 10-28 (TL)", solid content of 10 mass %)

(11) Coating Liquid for Uneven Layer 11

The following materials were diluted with a solvent mixture of toluene and cyclohexanone in a mass ratio of 70:30 such that the solid content concentration reached 40 mass %, thereby preparing a coating liquid for an uneven layer 11.

<Materials for Coating Liquid for Uneven Layer 11>
Pentaerythritol tetraacrylate: 45 Parts by mass
(trade name: PETA, Daicel-Cytec Company, Ltd.)
Urethane acrylate oligomer: 55 Parts by mass
(Mitsubishi Chemical Corporation, trade name "UV-1700B", solid content of 100 mass %)
Photopolymerization initiator: 3 Parts by mass
(IGM Resins B. V., trade name "ESACURE 1")
Organic particles: 0.5 Parts by mass
(Acrylic beads, average particle size: 3.6 μm, refractive index: 1.559, coefficient of variation: 10.5%)
Leveling agent: 0.5 Parts by mass
(Dainichiseika Color & Chemicals Mfg. Co., Ltd., trade name "SEIKABEAM 10-28 (TL)", solid content of 10 mass %)

(12) Coating Liquid for Antifouling Layer

The following materials were diluted with a solvent mixture of methyl isobutyl ketone, methyl ethyl ketone, and propylene glycol monomethyl ether acetate in a mass ratio of 40:30:30 such that the solid content concentration reached 2.5 mass %, thereby preparing a coating liquid for an antifouling layer.

<Materials for Coating Liquid for Antifouling Layer>
Compound (A) above: 15 Parts by mass
(Urethane acrylate oligomer, solid content of 100 mass %).
Fluororesin-containing composition: 850 Parts by mass
(Arakawa Chemical Industries, Ltd., trade name "TU-2362", solid content of 10 mass %)
Photopolymerization initiator: 5 Parts by mass
(IGM Resins B. V., trade name "Omnirad 127")
Hollow silica particles: 100 Parts by mass
(Average particle size of 60 nm, refractive index of 1.212)
Solid silica particles: 25 Parts by mass
(Average particle size of 15 nm)
Fluorine-based leveling agent: 100 Parts by mass
(Shin-Etsu Chemical Co., Ltd., trade name "X-71-1203M", solid content of 20 mass %)

4. Production and Preparation of PET Film and Measurement of in-Plane Retardation and the Like of PET Film As polyester films of the examples and the comparative examples, the following PET films 1 to 4 were produced, and the following PET film 5 was prepared.

In addition, the nx, ny, nz, and in-plane retardation (Re) of each PET film were measured using trade name "RETS-100" from Otsuka Electronics Co., Ltd. The Δn (nx−ny), ΔP, and in-plane retardation (Re) of each PET film are shown in Table 5.

4-1. PET Film 1

<Production of Raw Material (PET (A))>

At a point in time where the temperature of an esterification reaction can was raised and reached at 200° C., 86.5 parts by mass of terephthalic acid and 64.5 parts by mass of ethylene glycol were charged thereinto, and 0.020 parts by mass of antimony trioxide, 0.061 parts by mass of magnesium acetate tetrahydrate, and 0.16 parts by mass of triethylamine were charged thereinto under stirring as catalysts. Next, the components were pressurized and heated, a pressure esterification reaction was performed under conditions of a gauge pressure of 0.34 MPa and 240° C., then, the esterification reaction can was returned to normal pressure, and 0.014 parts by mass of phosphoric acid was added thereto. Furthermore, the components were heated to 260° C. for 15 minutes, and 0.012 parts by mass of trimethyl phosphate was added thereto. Next, after 15 minutes, a dispersion treatment was performed using a high-pressure disperser, furthermore, a sodium tripolyphosphate aqueous solution was added thereto to contain 0.1 mass % of sodium atoms with respect to silica particles, 35% of coarse grain portions were cut by a centrifugation treatment, and 0.2 parts by mass in terms of the particle content of an ethylene glycol slurry of silica particles having an average particle size of 2.5 μm that had been filtered with a metal filter having a sieve mesh size of 5 μm was added thereto. After 15 minutes, the obtained esterification reaction product was moved to a polycondensation reaction can, and a polycondensation reaction was performed at 280° C. under reduced pressure.

After the end of the polycondensation reaction, a filtration treatment was performed with a nylon filter having a 95% cut diameter of 5 μm, then, the reaction product was extruded from a nozzle in a strand shape, cooled and solidified using cooling water that had been filtered with a filter having a pore size of 1 μm or less in advance, and cut in a pellet shape. The intrinsic viscosity of the obtained polyethylene terephthalate resin (A) was 0.64 dl/g, the oligomer content was 0.96 mass %, and inert particles and internal precipitate particles were substantially not contained. "Polyethylene terephthalate resin (A)" may be referred to as "PET (A)".

<Production of Raw Material (PET (B))>

A polyethylene terephthalate resin (B) having an intrinsic viscosity of 0.62 dl/g was obtained by not adding silica particles in the manufacturing of the PET (A). "Polyethylene terephthalate resin (B)" may be referred to as "PET (B)".

<Production of PET Film 1>

100 Parts by mass of the pellets of the PET (B) resin having an intrinsic viscosity of 0.62 dl/g were dried at 135° C. for six hours under reduced pressure of 1 Torr and then supplied to an extruder 2 for an intermediate layer II layer. In addition, the PET (A) and the PET (B) were mixed and adjusted such that the content of silica particles reached 0.10 mass %, dried by a normal method, and then supplied to an extruder 1 for an external layer I layer and an external layer III. The silica particles were the silica particles that were contained in the PET (A). The PETs supplied to the extruders 1 and 2 were dissolved at 288° C. The dissolved polymers were each filtered with a filter medium of a sintered stainless steel body, laminated in a two-kind three-layer junction block, extruded in a sheet shape from a nozzle, then, wound around a casting drum having a surface temperature of 30° C. using an electrostatic application casting method, cooled and solidified, thereby producing a non-stretched film. At this time, the discharge rate of each extruder was adjusted such that the ratio of the thicknesses of a I layer, a II layer, and a III layer reached 5:90:5. The filter medium of a sintered stainless steel body is a filter medium of "nominal filtration accuracy; 10 μm particle 95% cut".

This non-stretched film was heated to 100° C. with a heated roll group and an infrared heater and then stretched 3.0 times in the longitudinal direction with the roll group where the circumferential speeds were different, thereby obtaining a uniaxially-oriented PET film.

Next, the uniaxially-stretched film was guided to a tenter stretching machine, guided to a hot air zone having a temperature of 140° C. with the end portions of the film gripped with clips, and stretched 3.2 times in the width direction. Next, the film was guided to a hot air zone having a temperature of 210° C. while holding the width stretched in the width direction and stretched 1.1 times in the width direction in this hot air zone. Furthermore, a thermal treatment was performed for about five seconds in the hot air zone having a temperature of 210° C., and then a 3% relaxation treatment was performed in the width direction, thereby obtaining a biaxially-stretched PET film having a film thickness of about 40 μm (PET film 1).

4-2. PET Film 2

A biaxially stretched PET film 2 was obtained in the same manner as the PET film 1 except that the stretching ratio in the longitudinal direction was changed to 3.5 times, the stretching ratio of the first stage in the width direction was changed to 3.6 times, and the stretching ratio of the second stage in the width direction was changed to 1.2 times.

4-3. PET Film 3

A biaxially stretched PET film 3 was obtained in the same manner as the PET film 1 except that the stretching ratio in the longitudinal direction was changed to 3.9 times, the stretching ratio of the first stage in the width direction was changed to 3.7 times, the temperature during the stretching of the second stage in the width direction was changed to 220° C., the stretching ratio of the second stage in the width direction was changed to 1.2 times, and the temperature during the relaxation treatment was changed to 220° C.

4-4. PET Film 4

A 25 μm-thick biaxially stretched PET film of Example 9 of JP 2018-112635 A was produced with reference to the same publication. The same PET film was regarded as a PET film 4.

4-5. PET Film 5

As a PET film 5, a commercially available biaxially stretched PET film (trade name "COSMOSHINE A4100" manufactured by Toyobo Co., Ltd., thickness of 38 μm, easy adhesive layer present on one surface)

4-6. PET Film 6

A biaxially stretched PET film 6 was obtained in the same manner as the PET film 1 except that the stretching ratio of the first stage in the width direction was changed to 3.5 times.

4-7. PET Film 7

A biaxially stretched PET film 7 was obtained in the same manner as the PET film 1 except that the stretching ratio of the first stage in the width direction was changed to 3.4 times.

4-8. PET Film 8

A biaxially stretched PET film 8 was obtained in the same manner as the PET film 1 except that the stretching ratio in the longitudinal direction was changed to 3.1 times and the stretching ratio of the second stage in the width direction was changed to 1.2 times.

4-9. PET Film 9

A biaxially stretched PET film 9 was obtained in the same manner as the PET film 1 except that the stretching ratio in the longitudinal direction was changed to 4.0 times, the stretching ratio of the first stage in the width direction was changed to 3.7 times, the temperature during the stretching of the second stage in the width direction was changed to 220° C., the stretching ratio of the second stage in the width direction was changed to 1.2 times, and the temperature during the relaxation treatment was changed to 220° C.

5. Production of Optical Laminate 5-1. Optical Laminate for which PET Film 1 was Used Example 1

The following coating liquid for an easy adhesive layer 1 was applied onto the PET film 1 (refer to the section "4". ΔP: 0.150, nx−ny: 0.125, Re: 500 nm) such that the wet mass reached 5 g/m$^2$ and dried at 70° C. for 30 seconds, thereby forming an easy adhesive layer having a dried mass of 0.5 g/m$^2$.

Next, the coating liquid for an uneven layer 2 was applied onto the easy adhesive layer such that the wet mass reached 12.5 g/m$^2$ (dried mass of 5 g/m$^2$), dried at 70° C. for 30 seconds, and irradiated with 100 mJ/cm$^2$ of ultraviolet rays, thereby forming an uneven layer having a dried thickness of 5 μm.

Next, the coating liquid for an antifouling layer was applied onto the uneven layer such that the wet mass reached 4 g/m$^2$ (dried mass of 0.1 g/m$^2$), dried at 60° C. for 30 seconds, and irradiated with 200 mJ/cm$^2$ of ultraviolet rays, thereby forming an antifouling layer having a dried thickness of 100 nm and obtaining an optical laminate of Example 1.

<Coating Liquid for Easy Adhesive Layer 1>

A coating liquid obtained by diluting a mixture of 33 parts by mass of a polyester resin (trade name "VYLON UR-1400" from Toyobo Co., Ltd.) and 1 part by mass of a crosslinking agent (trade name "TAKENATE D110N" from Mitsui Chemicals, Inc.) with a solvent mixture of methyl ethyl ketone and toluene in a mass ratio of 8:2 to a solid content of 10 mass %.

Manufacturing conditions such as the wet masses of the uneven layer and the antifouling layer; the drying conditions for the uneven layer and the antifouling layer; the ultraviolet irradiation conditions for the uneven layer and the antifouling layer; the dried thicknesses of the uneven layer and the antifouling layer in the optical laminate of Example 1 are regarded as a production method 1. A value "1" for the item "production method" in Tables 1 to 4 means that the above-described manufacturing conditions are the same as those for the optical laminate of Example 1.

Examples 2 to 5

Optical laminates of Examples 2 to 5 were obtained in the same manner as in Example 1 except that the coating liquid for an uneven layer 2 was changed to a coating liquid shown in Table 1.

Example 6

The coating liquid for an easy adhesive layer 1 was applied onto the PET film 1 (refer to the section "4") such that the wet mass reached 5 g/m² and dried at 70° C. for 30 seconds, thereby forming an easy adhesive layer having a dried mass of 0.5 g/m².

Next, the coating liquid for an uneven layer 3 was applied onto the easy adhesive layer such that the wet mass reached 2.5 g/m² (dried mass of 1 g/m²), dried at 70° C. for 30 seconds, and irradiated with 100 mJ/cm² of ultraviolet rays, thereby forming an uneven layer having a dried thickness of 1 μm.

Next, the coating liquid for an antifouling layer was applied onto the uneven layer such that the wet mass reached 4 g/m² (dried mass of 0.1 g/m²), dried at 60° C. for 30 seconds, and irradiated with 200 mJ/cm² of ultraviolet rays, thereby forming an antifouling layer having a dried thickness of 100 nm and obtaining an optical laminate of Example 6.

Manufacturing conditions such as the wet masses of the uneven layer and the antifouling layer; the drying conditions for the uneven layer and the antifouling layer; the ultraviolet irradiation conditions for the uneven layer and the antifouling layer; the dried thicknesses of the uneven layer and the antifouling layer in the optical laminate of Example 6 are regarded as a production method 2.

Comparative Examples 1 and 2 and 4 to 7

Optical laminates of Comparative Examples 1 and 2 and 4 to 7 were obtained in the same manner as in Example 1 except that the coating liquid for an uneven layer 2 was changed to a coating liquid shown in Table 1.

Comparative Example 3

The coating liquid for an easy adhesive layer 1 was applied onto the PET film 1 (refer to the section "4") such that the wet mass reached 5 g/m² and dried at 70° C. for 30 seconds, thereby forming an easy adhesive layer having a dried mass of 0.5 g/m².

Next, the coating liquid for an uneven layer 1 was applied onto the easy adhesive layer such that the wet mass reached 12.5 g/m² (dried mass of 5 g/m²), dried at 50° C. for 30 seconds, and irradiated with 100 mJ/cm² of ultraviolet rays, thereby forming an uneven layer having a dried thickness of 5 μm.

Next, the coating liquid for an antifouling layer was applied onto the uneven layer such that the wet mass reached 4 g/m² (dried mass of 0.1 g/m²), dried at 60° C. for 30 seconds, and irradiated with 200 mJ/cm² of ultraviolet rays, thereby forming an antifouling layer having a dried thickness of 100 nm and obtaining an optical laminate of Comparative Example 3.

Manufacturing conditions such as the wet masses of the uneven layer and the antifouling layer; the drying conditions for the uneven layer and the antifouling layer; the ultraviolet irradiation conditions for the uneven layer and the antifouling layer; the dried thicknesses of the uneven layer and the antifouling layer in the optical laminate of Comparative Example 3 are regarded as a production method 3. A value "3" for the item "production method" in Tables 1 to 4 means that the above-described manufacturing conditions are the same as those for the optical laminate of Comparative Example 3.

5-2. Optical Laminate for which PET Film 2 was Used

Examples 7 to 12

Optical laminates of Examples 7 to 12 were obtained in the same manner as in Examples 1 to 6 except that the PET film 1 was changed to the PET film 2 in the section "4".

Comparative Examples 8 to 14

Optical laminates of Comparative Examples 8 to 14 were obtained in the same manner as in Comparative Examples 1 to 7 except that the PET film 1 was changed to the PET film 2 in the section "4".

5-3. Optical Laminate for which PET Film 3 was Used

Examples 13 to 18

Optical laminates of Examples 13 to 18 were obtained in the same manner as in Examples 1 to 6 except that the PET film 1 was changed to the PET film 3 in the section "4".

Comparative Examples 15 to 21

Optical laminates of Comparative Examples 15 to 21 were obtained in the same manner as in Comparative Examples 1 to 7 except that the PET film 1 was changed to the PET film 3 in the section "4".

5-4. Optical Laminate where Thickness of Antifouling Layer was Changed

Example 19

An optical laminate of Example 19 was obtained in the same manner as in Example 1 except that the thickness of the antifouling layer was changed to 90 nm.

Example 20

An optical laminate of Example 20 was obtained in the same manner as in Example 1 except that the thickness of the antifouling layer was changed to 110 nm.

TABLE 1

| | | PET film | Uneven layer coating liquid | Production method | Surface roughness Sa (μm) | Ssk | A | Adhesion | Bright spot | Contact angle (degrees) | Reflectance (%) | Tt (%) | Hz (%) |
|---|---|---|---|---|---|---|---|---|---|---|---|---|---|
| Example | 1 | 1 | 2 | 1 | 0.040 | 0.40 | 1.00 | A | A | 110 | 1.1 | 94.7 | 1.1 |
| | 2 | | 3 | 1 | 0.050 | 0.30 | 1.22 | A | A | 109 | 1.2 | 94.8 | 1.8 |

TABLE 1-continued

| | | PET film | Uneven layer coating liquid | Production method | Surface roughness Sa (μm) | Ssk | A | Adhesion | Bright spot | Contact angle (degrees) | Reflectance (%) | Tt (%) | Hz (%) |
|---|---|---|---|---|---|---|---|---|---|---|---|---|---|
| | 3 | | 4 | 1 | 0.055 | 0.20 | 1.44 | A | A | 110 | 1.2 | 94.5 | 0.3 |
| | 4 | | 5 | 1 | 0.060 | 0.15 | 1.60 | A | A | 109 | 1.3 | 95.3 | 2.5 |
| | 5 | | 6 | 1 | 0.093 | 0.96 | 0.99 | B | B | 102 | 2.1 | 94.0 | 22.9 |
| | 6 | | 3 | 2 | 0.081 | 0.50 | 1.21 | A | A | 108 | 1.4 | 95.0 | 2.0 |
| Comparative Example | 1 | 1 | 1 | 1 | 0.005 | 0.50 | 0 | C | A | 111 | 0.8 | 95.2 | 0.1 |
| | 2 | | 7 | 1 | 0.324 | 0.37 | 1.93 | A | C | 96 | 3.2 | 91.9 | 40.3 |
| | 3 | | 1 | 3 | 0.012 | −0.02 | — | C | A | 110 | 0.9 | 95.3 | 0.1 |
| | 4 | | 8 | 1 | 0.006 | 13.54 | −1.35 | C | C | 104 | 1.4 | 95.1 | 0.2 |
| | 5 | | 9 | 1 | 0.004 | 0.19 | 0.32 | C | A | 105 | 1.1 | 95.0 | 0.2 |
| | 6 | | 10 | 1 | 0.087 | 1.69 | 0.71 | B | C | 97 | 2.7 | 92.1 | 40.1 |
| | 7 | | 11 | 1 | 0.055 | 0.90 | 0.79 | C | A | 109 | 1.5 | 95.4 | 0.9 |

TABLE 2

| | | PET film | Uneven layer coating liquid | Production method | Surface roughness Sa (μm) | Ssk | A | Adhesion | Bright spot | Contact angle (degrees) | Reflectance (%) | Tt (%) | Hz (%) |
|---|---|---|---|---|---|---|---|---|---|---|---|---|---|
| Example | 7 | 2 | 2 | 1 | 0.040 | 0.40 | 1.00 | A | A | 110 | 1.1 | 94.7 | 1.1 |
| | 8 | | 3 | 1 | 0.050 | 0.30 | 1.22 | A | A | 109 | 1.2 | 94.8 | 1.8 |
| | 9 | | 4 | 1 | 0.055 | 0.20 | 1.44 | A | A | 110 | 1.2 | 94.5 | 0.3 |
| | 10 | | 5 | 1 | 0.060 | 0.15 | 1.60 | A | A | 109 | 1.3 | 95.3 | 2.5 |
| | 11 | | 6 | 1 | 0.093 | 0.96 | 0.99 | B | B | 102 | 2.1 | 94.0 | 22.9 |
| | 12 | | 3 | 2 | 0.081 | 0.50 | 1.21 | A | A | 108 | 1.4 | 95.0 | 2.0 |
| Comparative Example | 8 | 2 | 1 | 1 | 0.005 | 0.50 | 0 | C | A | 111 | 0.8 | 95.2 | 0.1 |
| | 9 | | 7 | 1 | 0.324 | 0.37 | 1.93 | A | C | 96 | 3.2 | 91.9 | 40.3 |
| | 10 | | 1 | 3 | 0.012 | −0.02 | — | C | A | 110 | 0.9 | 95.3 | 0.1 |
| | 11 | | 8 | 1 | 0.006 | 13.54 | −1.35 | C | C | 104 | 1.4 | 95.1 | 0.2 |
| | 12 | | 9 | 1 | 0.004 | 0.19 | 0.32 | C | A | 105 | 1.1 | 95.0 | 0.2 |
| | 13 | | 10 | 1 | 0.087 | 1.69 | 0.71 | B | C | 97 | 2.7 | 92.1 | 40.1 |
| | 14 | | 11 | 1 | 0.055 | 0.90 | 0.79 | C | A | 109 | 1.5 | 95.4 | 0.9 |

TABLE 3

| | | PET film | Uneven layer coating liquid | Production method | Surface roughness Sa (μm) | Ssk | A | Adhesion | Bright spot | Contact angle (degrees) | Reflectance (%) | Tt (%) | Hz (%) |
|---|---|---|---|---|---|---|---|---|---|---|---|---|---|
| Example | 13 | 3 | 2 | 1 | 0.040 | 0.40 | 1.00 | A | A | 110 | 1.1 | 94.7 | 1.1 |
| | 14 | | 3 | 1 | 0.050 | 0.30 | 1.22 | A | A | 109 | 1.2 | 94.8 | 1.8 |
| | 15 | | 4 | 1 | 0.055 | 0.20 | 1.44 | A | A | 110 | 1.2 | 94.5 | 0.3 |
| | 16 | | 5 | 1 | 0.060 | 0.15 | 1.60 | A | A | 109 | 1.3 | 95.3 | 2.5 |
| | 17 | | 6 | 1 | 0.093 | 0.96 | 0.99 | B | B | 102 | 2.1 | 94.0 | 22.9 |
| | 18 | | 3 | 2 | 0.081 | 0.50 | 1.21 | A | A | 108 | 1.4 | 95.0 | 2.0 |
| Comparative Example | 15 | 3 | 1 | 1 | 0.005 | 0.50 | 0 | C | A | 111 | 0.8 | 95.2 | 0.1 |
| | 16 | | 7 | 1 | 0.324 | 0.37 | 1.93 | A | C | 96 | 3.2 | 91.9 | 40.3 |
| | 17 | | 1 | 3 | 0.012 | −0.02 | — | C | A | 110 | 0.9 | 95.3 | 0.1 |
| | 18 | | 8 | 1 | 0.006 | 13.54 | −1.35 | C | C | 104 | 1.4 | 95.1 | 0.2 |
| | 19 | | 9 | 1 | 0.004 | 0.19 | 0.32 | C | A | 105 | 1.1 | 95.0 | 0.2 |
| | 20 | | 10 | 1 | 0.087 | 1.69 | 0.71 | B | C | 97 | 2.7 | 92.1 | 40.1 |
| | 21 | | 11 | 1 | 0.055 | 0.90 | 0.79 | C | A | 109 | 1.5 | 95.4 | 0.9 |

TABLE 4

| | PET film | Uneven layer coating liquid | Production method | Surface roughness Sa (μm) | Ssk | A | Thickness of antifouling layer [nm] | Adhesion | Bright spot | Contact angle (degrees) | Reflectance (%) | Tt (%) | Hz (%) |
|---|---|---|---|---|---|---|---|---|---|---|---|---|---|
| Example 1 | 1 | 2 | 1 | 0.040 | 0.40 | 1.00 | 100 | A | A | 110 | 1.1 | 94.7 | 1.1 |
| 19 | | 3 | 1 | 0.040 | 0.40 | 1.00 | 90 | A | A | 108 | 1.2 | 94.6 | 1.1 |
| 20 | | 4 | 1 | 0.040 | 0.40 | 1.00 | 110 | A | A | 111 | 1.2 | 94.7 | 1.0 |

From Tables 1 to 4, it is possible to confirm that the optical laminates of the examples were excellent in terms of adhesion between the polyester film having a high degree of plane orientation ΔP and the easy adhesive layer, furthermore, were excellent in terms of adhesion as the entire optical laminate, and were capable of suppressing a local defect.

6. Verification of Pencil Hardness and Rainbow Unevenness
6-1. Production of Optical Laminate Examples 21 to 24

Optical laminates of Examples 21 to 24 were obtained in the same manner as in Example 1 except that the PET film 1 was changed to the PET films 6 to 9 in the section "4".

Comparative Example 8

An optical laminate of Comparative Example 8 was obtained in the same manner as in Example 1 except that the PET film 1 was changed to the PET film 4 in the section "4".

Comparative Example 9

An optical laminate of Comparative Example 9 was obtained in the same manner as in Example 1 except that the PET film 1 was changed to the PET film 5 in the section "4". In the optical laminate of Comparative Example 9, the easy adhesive layer, the uneven layer, and the antifouling layer were formed on the surface of the PET film 5 where the easy adhesive layer was not present.

6-2. Evaluation

Measurements and evaluations of the following (1) and (2) were performed on the optical laminates obtained in Examples 1, 7, 13, 21 to 24 and Comparative Examples 8 and 9. The results are shown in Table 5.

(1) Pencil Hardness

The optical laminates obtained in Examples 1, 7, 13, 21 to 24 and Comparative Examples 8 and 9 were heated at 100° C. for 10 minutes. For the heated optical laminates, the pencil hardness was measured based on the scratch hardness (pencil method) of JIS K 5600-5-4:1999. Specifically, a pencil having predetermined hardness was moved on the surface of the optical laminate on the antifouling layer side at an angle of 45° with respect to the surface of the sample, a load of 500 g, and a speed of 1.4 mm/sec, and the pencil hardness was measured. After the load was applied to the optical laminate, which was the sample, and before scratches were visually evaluated, the sample was heated again at 100° C. for 10 minutes.

The above-described operation was performed on each sample three times using pencils having predetermined hardness. At this time, for the sample that was evaluated no scratch by a lot of hardness pencils, the hardness of the hardest pencil was regarded as the pencil hardness of the sample.

(2) Rainbow Unevenness

The optical laminate of each of the examples and the comparative examples was disposed on a viewer-side polarizing plate of an image display device 1 having the following configuration such that the surface on the PET film side faced the polarizing plate. Next, the image display device was lighted in a dark room environment and observed with naked eyes at a variety of angles, and the presence or absence of rainbow unevenness was evaluated with the following standards. Evaluators were a total of 20 healthy persons having a corrected eyesight of 1.0 or higher, five persons from each of the generations of twenties to fifties.

For the atmosphere during the evaluation, the temperature was set to 23±5° C., and the relative humidity was set to 40% or higher and 65% or lower. In addition, before the beginning of the evaluation, a subject sample was exposed to the atmosphere for 30 minutes or longer and then evaluated.

A: 16 or more persons answer that they cannot view any rainbow unevenness.

B: 11 or more or 15 or less persons answer that they cannot view any rainbow unevenness.

C: 10 or less persons answer that they cannot view any rainbow unevenness.

<Configuration of Image Display Device 1>

(1) Display element: Three-color independent organic EL display element having a microcavity structure (cover rate of BT.2020-2 based on CIE-xy chromaticity diagram: 77%).

(2) Light source-side polarizing plate: None (3) Viewer-side polarizing plate: Polarizing plate where a TAC film was used as a polarizer protective film of a polarizer composed of PVA and iodine disposed in a manner that the direction of the absorption axis of the polarizer became parallel to the horizontal direction of a screen.

(4) Size: 10 inches diagonally

TABLE 5

| | PET film | | | | Evaluation | |
|---|---|---|---|---|---|---|
| | No. | ΔP | nx-ny | Re (nm) | Pencil hardness | Rainbow unevenness |
| Example 1 | 1 | 0.150 | 0.0125 | 500 | 2H | A |
| Example 7 | 2 | 0.162 | 0.0225 | 900 | 2H | A |
| Example 13 | 3 | 0.170 | 0.0175 | 700 | 2H | A |
| Example 21 | 6 | 0.144 | 0.0336 | 1344 | 2H | B |
| Example 22 | 7 | 0.152 | 0.0289 | 1156 | 2H | B |

TABLE 5-continued

| | PET film | | | Evaluation | |
| --- | --- | --- | --- | --- | --- |
| No. | ΔP | nx-ny | Re (nm) | Pencil hardness | Rainbow unevenness |
| Example 23 | 8 | 0.168 | 0.0056 | 224 | 2H | A |
| Example 24 | 9 | 0.196 | 0.0170 | 681 | 2H | A |
| Comparative Example 8 | 4 | 0.059 | 0.0040 | 100 | F | A |
| Comparative Example 9 | 5 | 0.127 | 0.0395 | 1500 | H | C |

From Table 4, it is possible to confirm that the optical laminates of the examples in which a polyester film satisfying the formulae 1-1 and 1-2 was used were capable of suppressing rainbow unevenness that were attributed to in-plane retardation and capable of improving the pencil hardness of the optical laminates.

REFERENCE SIGNS LIST

10 Polyester film
20 Easy adhesive layer
30 Uneven layer
40 Antifouling layer
100 Optical laminate

The invention claimed is:

1. An optical laminate, comprising an easy adhesive layer, an uneven layer, and an antifouling layer in this order on a polyester film,
  wherein, when a refractive index in a slow axis direction in a plane of the polyester film is defined as nx, a refractive index in a direction orthogonal to the slow axis in the same plane is defined as ny, and a refractive index in a thickness direction of the polyester film is defined as nz, the polyester film satisfies the following formula 1-2, and
  regarding the uneven layer, when a three-dimensional skewness of a surface of the uneven layer is defined as Ssk, and a three-dimensional arithmetic average roughness of the surface of the uneven layer is defined as Sa, Ssk and Sa satisfy the following formula 2-1:

$$0.140 \leq \Delta P \quad (1\text{-}2)$$

$$1.00 \leq A \leq 1.60 \quad (2\text{-}1)$$

wherein "ΔP" represents ((nx+ny)/2−nz), and
"A" represents logo (Sa [μm]×100/Ssk), provided that 0<Ssk.

2. The optical laminate according to claim 1, wherein the polyester film further satisfies the following formula 1-1:

$$nx-ny \leq 0.0250 \quad (1\text{-}1).$$

3. The optical laminate according to claim 1, wherein Ssk of the uneven layer satisfies the following formula 2-2:

$$0.10 \leq Ssk \leq 1.50 \quad (2\text{-}2).$$

4. The optical laminate according to claim 1, wherein Sa of the uneven layer satisfies the following formula 2-3:

$$0.020 \text{ μm} \leq Sa \leq 0.200 \text{ μm} \quad (2\text{-}3).$$

5. The optical laminate according to claim 1, wherein a thickness of the antifouling layer is 1 nm or more and 200 nm or less.

6. The optical laminate according to claim 1, wherein a contact angle of a surface of the antifouling layer with pure water is 80 degrees or more.

7. The optical laminate according to claim 1, wherein a luminous reflectance Y value measured at a light incident angle of 5 degrees from a side where the antifouling layer is present is 3.0% or less.

8. The optical laminate according to claim 1, wherein a thickness of the polyester film is 10 μm or more and 75 μm or less.

9. A polarizing plate comprising:
  a polarizer;
  a first transparent protective plate disposed on one side of the polarizer; and
  a second transparent protective plate disposed on the other side of the polarizer,
  wherein at least one selected from the group consisting of the first transparent protective plate and the second transparent protective plate is the optical laminate according to claim 1, and the optical laminate is disposed such that a surface on the antifouling layer side faces opposite to the polarizer.

10. A surface plate for an image display device, comprising an optical laminate attached onto a resin plate or a glass plate,
  wherein the optical laminate is the optical laminate according to claim 1, and the optical laminate is disposed such that a surface on the antifouling layer side faces opposite to the resin plate or the glass plate.

11. An image display device, comprising the optical laminate according to claim 1 disposed on a display element such that a surface on the antifouling layer side faces opposite to the display element, and that the optical laminate is disposed on a surface.

12. The optical laminate according to claim 1, wherein the polyester film is a polyethylene terephthalate film.

* * * * *